(12) United States Patent
Shin

(10) Patent No.: US 7,578,260 B2
(45) Date of Patent: Aug. 25, 2009

(54) MILKING LINER

(75) Inventor: Jin-Woong Shin, Copley, OH (US)

(73) Assignee: Lauren AgriSystems, Ltd., New Philadelphia, OH (US)

( * ) Notice: Subject to any disclaimer, the term of this patent is extended or adjusted under 35 U.S.C. 154(b) by 365 days.

(21) Appl. No.: 11/170,733

(22) Filed: Jun. 28, 2005

(65) Prior Publication Data
US 2006/0005772 A1 Jan. 12, 2006

Related U.S. Application Data

(60) Provisional application No. 60/583,705, filed on Jun. 29, 2004, provisional application No. 60/683,277, filed on May 20, 2005.

(51) Int. Cl.
*A01J 5/04* (2006.01)
(52) U.S. Cl. .............. 119/14.52; 119/14.47; 119/14.49; 119/14.01
(58) Field of Classification Search .... 119/14.01–14.55
See application file for complete search history.

(56) References Cited

U.S. PATENT DOCUMENTS

| | | | | |
|---|---|---|---|---|
| 1,000,948 | A | * | 8/1911 | Ridd ........................ 119/14.52 |
| 1,285,079 | A | * | 11/1918 | Eklundh et al. .......... 119/14.52 |
| 1,312,941 | A | * | 8/1919 | Anderson ................ 119/14.52 |
| 1,365,665 | A | * | 1/1921 | Davies .................... 119/14.51 |
| 2,099,884 | A | | 11/1937 | Green |
| 2,341,953 | A | | 2/1944 | Scott |
| 2,502,362 | A | | 3/1950 | Babson |
| 2,997,980 | A | * | 8/1961 | Noorlander .............. 119/14.52 |
| 3,611,993 | A | | 10/1971 | Norton |
| 3,659,558 | A | | 5/1972 | Noorlander |
| 3,720,235 | A | * | 3/1973 | Schrock .................... 138/137 |
| 4,196,696 | A | | 4/1980 | Olander |
| 4,324,201 | A | | 4/1982 | Larson |
| 4,372,250 | A | | 2/1983 | Larson |
| 4,530,307 | A | | 7/1985 | Thompson |
| 4,572,106 | A | | 2/1986 | Mills |
| 4,604,969 | A | | 8/1986 | Larson |
| 4,745,881 | A | | 5/1988 | Larson |
| 4,756,275 | A | | 7/1988 | Larson |
| 4,869,205 | A | | 9/1989 | Larson |

(Continued)

FOREIGN PATENT DOCUMENTS

DE 1011212 * 6/1957

(Continued)

OTHER PUBLICATIONS

PCT ISA, International Search Report.

*Primary Examiner*—Andrea M Valenti
(74) *Attorney, Agent, or Firm*—Zollinger & Burleson Ltd.

(57) ABSTRACT

A milking liner for an automated milking machine includes a barrel that moves between an uncollapsed position and a collapsed condition when it is subjected to a vacuum milking condition. The barrel defines at least three parallel channels open to the inner surface of the barrel. The configuration of the sidewall of the barrel and the channels cause the barrel to uniformly collapse when the barrel is subjected to a vacuum milking condition. In one configuration, ribs protrude from the barrel sidewall and define channels with the same wall thickness as the sidewall segments disposed between the ribs.

14 Claims, 25 Drawing Sheets

U.S. PATENT DOCUMENTS

| | | |
|---|---|---|
| 5,007,378 A | 4/1991 | Larson |
| 5,069,162 A | 12/1991 | Thompson |
| 5,080,041 A | 1/1992 | Steingraber |
| 5,224,442 A | 7/1993 | Davies |
| 5,482,004 A | 1/1996 | Chowdhury |
| 5,572,947 A | 11/1996 | Larson |
| 5,725,947 A | 3/1998 | Johannsen |
| 5,752,462 A | 5/1998 | Petersson |
| 5,765,599 A | 6/1998 | Hernvall |
| 6,039,001 A | 3/2000 | Sanford |
| 6,164,243 A | 12/2000 | Larson |
| D447,840 S | 9/2001 | Alveby |
| 6,427,624 B1 | 8/2002 | Briggs |
| 6,435,132 B1 | 8/2002 | Milbrath |
| 6,546,893 B1 | 4/2003 | Happel |
| 6,588,364 B1 | 7/2003 | Petterson |
| 6,631,694 B1 | 10/2003 | Chowdhury |
| 6,722,310 B1 | 4/2004 | Alveby |
| D489,866 S | 5/2004 | Brown |
| 6,742,475 B1 | 6/2004 | McLeod et al. |
| 6,745,718 B1 | 6/2004 | Chowdhury |
| 6,755,153 B1 | 6/2004 | Chowdhury |
| 6,776,120 B1 * | 8/2004 | Chowdhury ............. 119/14.46 |
| 6,789,501 B2 | 9/2004 | Brown |
| 6,796,272 B1 * | 9/2004 | Chowdhury ............. 119/14.47 |
| 6,857,389 B2 | 2/2005 | Miller |
| 2004/0025794 A1 * | 2/2004 | Maier et al. ............... 119/14.51 |
| 2004/0060520 A1 * | 4/2004 | Sellner et al. ............ 119/14.54 |
| 2004/0094096 A1 | 5/2004 | Fransen |
| 2005/0284379 A1 * | 12/2005 | Shin ........................ 119/14.47 |
| 2007/0012252 A1 * | 1/2007 | Gisslegard et al. ....... 119/14.47 |

FOREIGN PATENT DOCUMENTS

| | | |
|---|---|---|
| EP | 1329155 A2 | 7/2003 |
| EP | 1425959 A2 | 6/2004 |

* cited by examiner

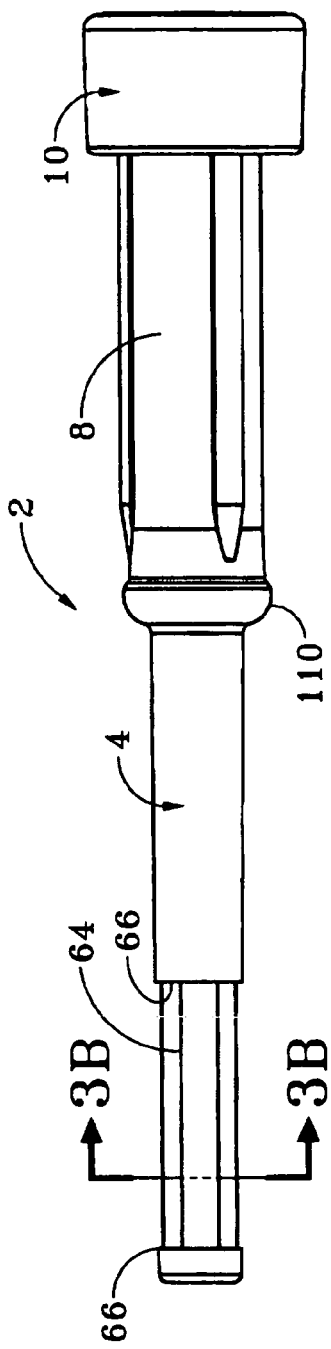
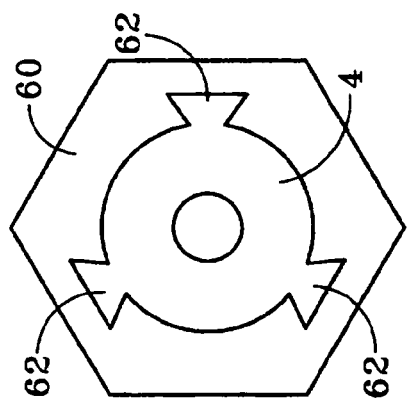
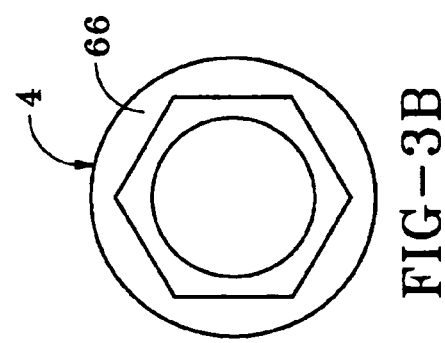
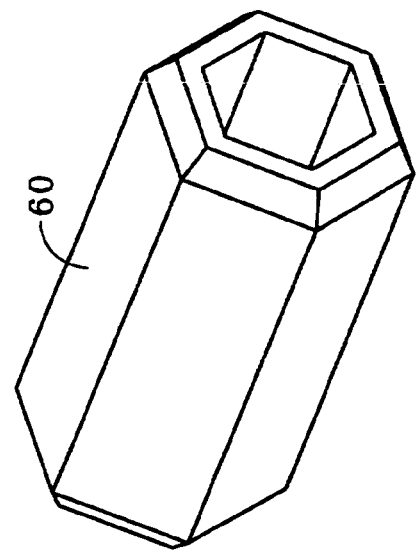
FIG-3A
FIG-3B
FIG-3C
FIG-4

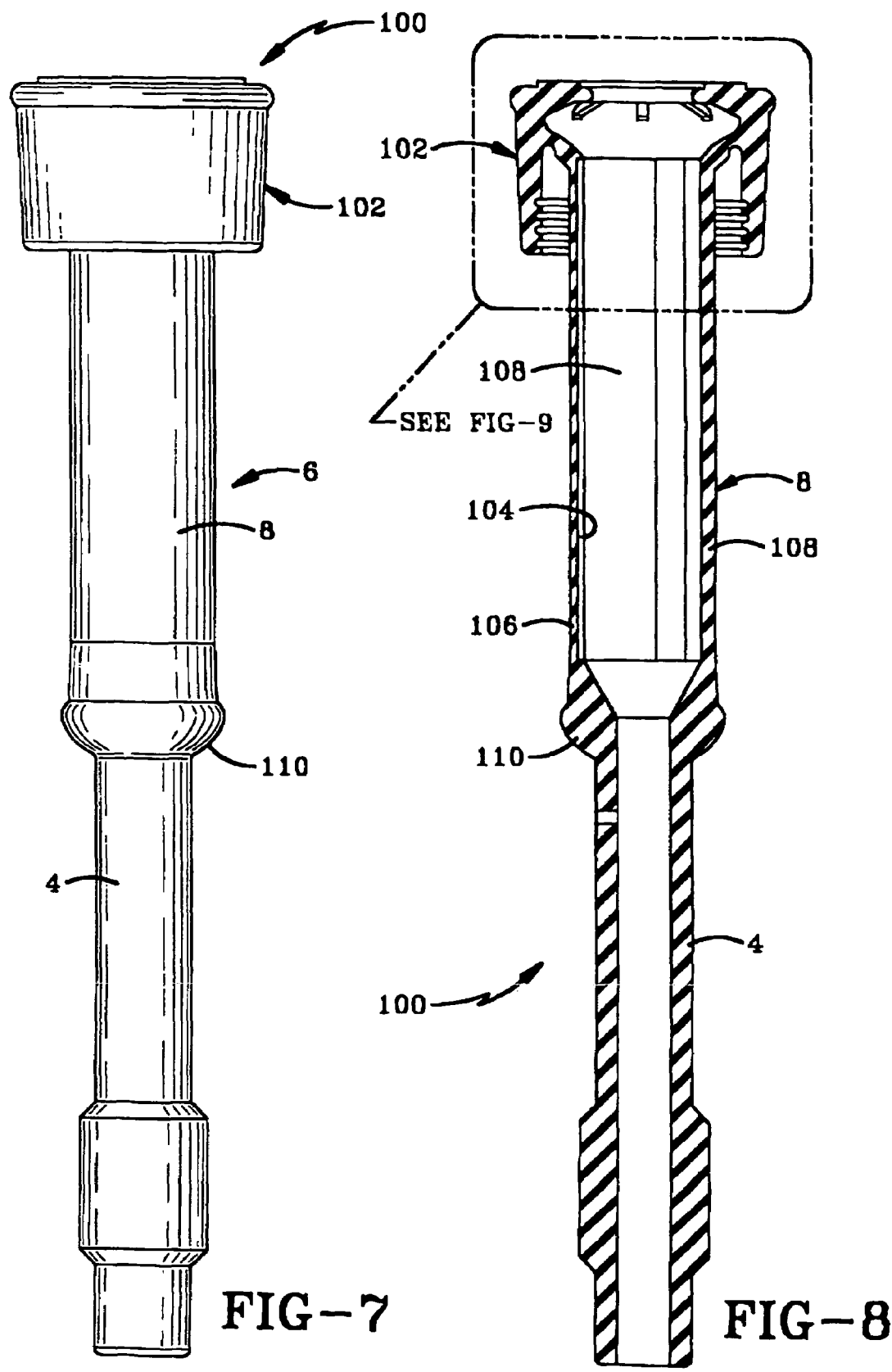

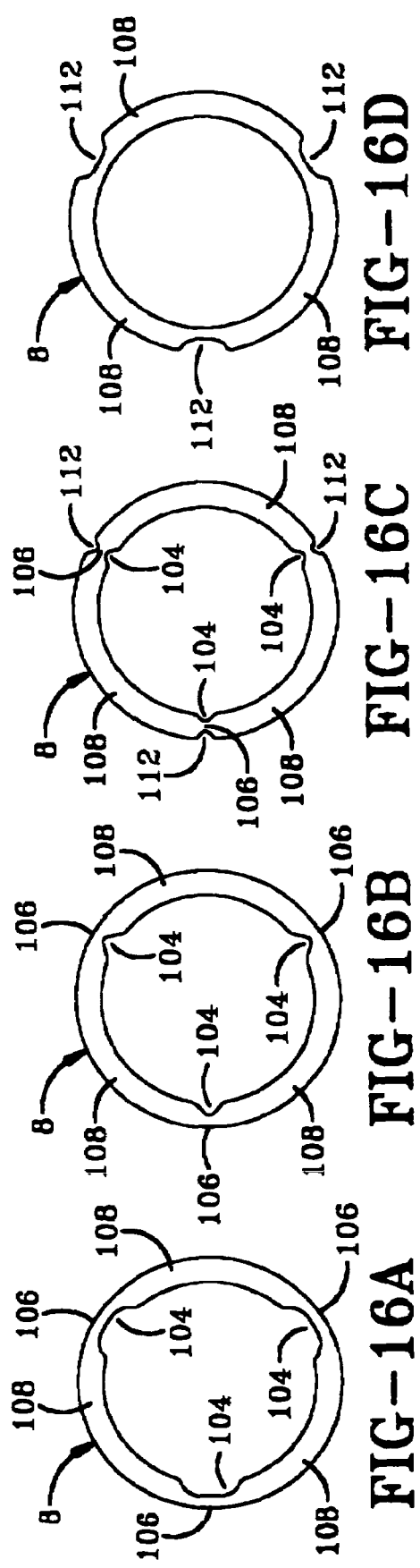
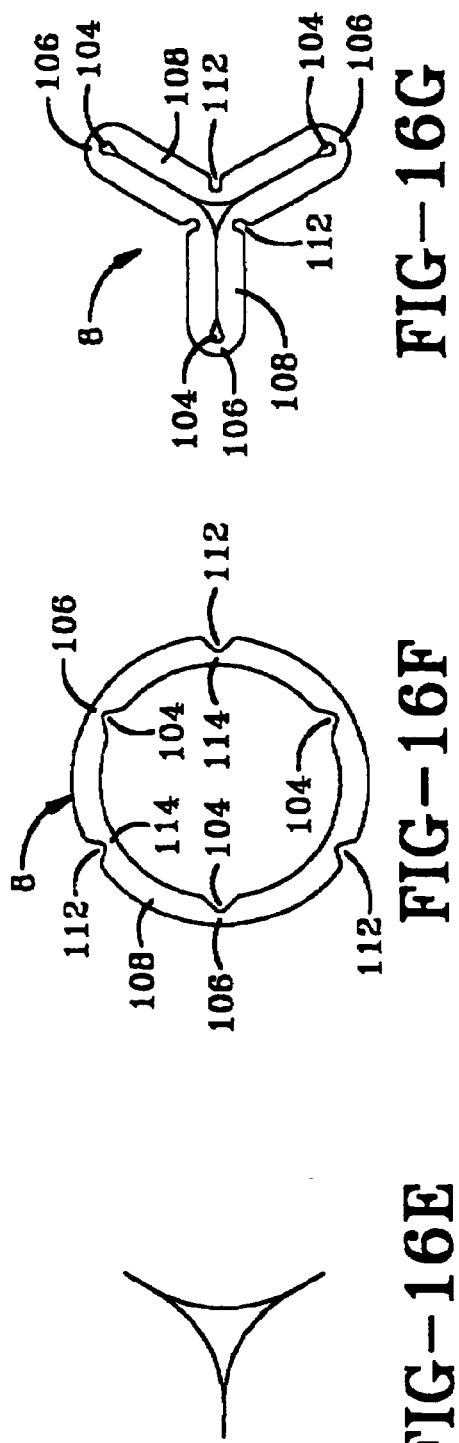

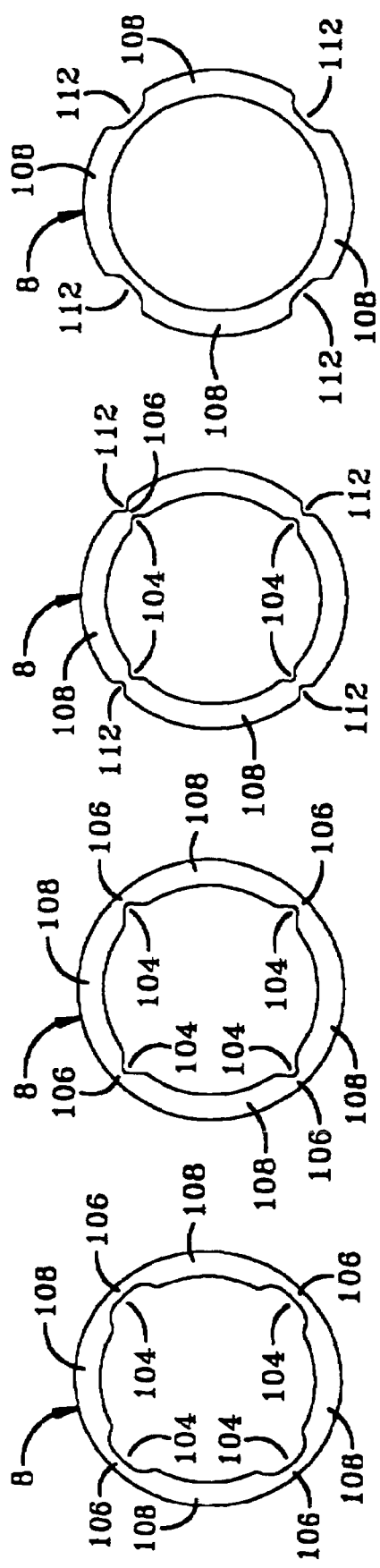
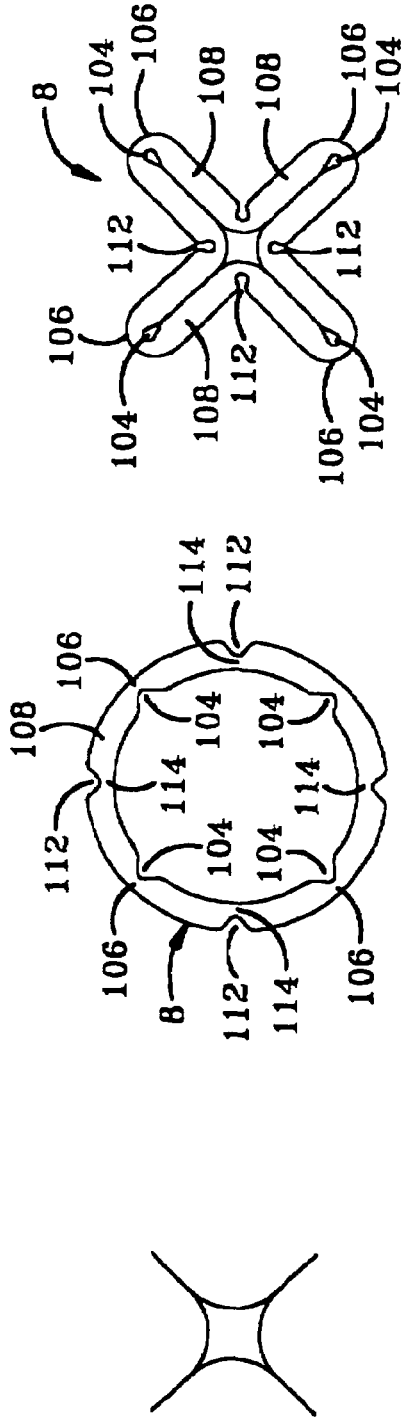

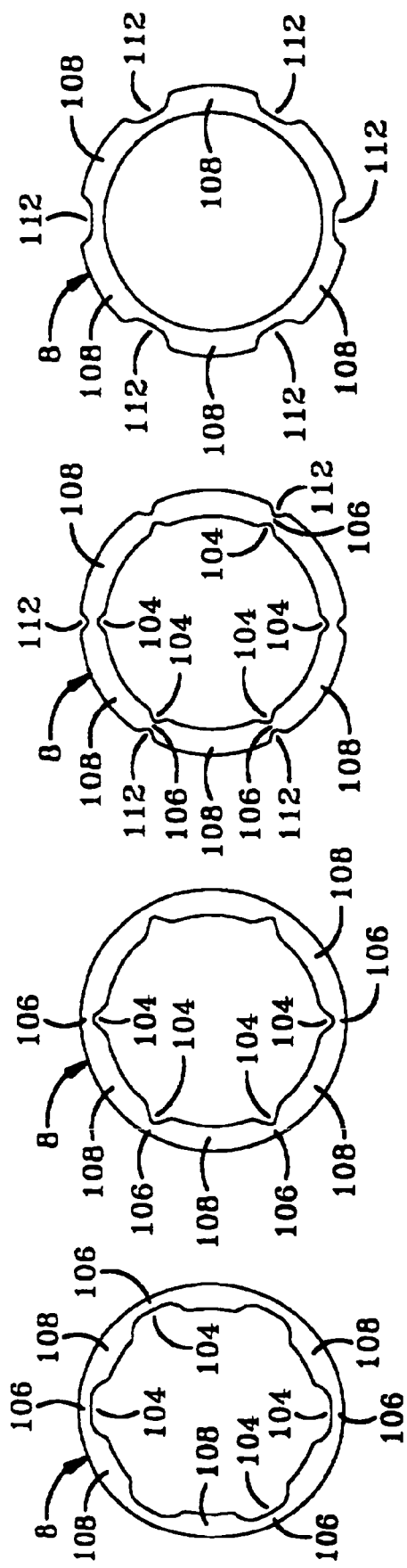
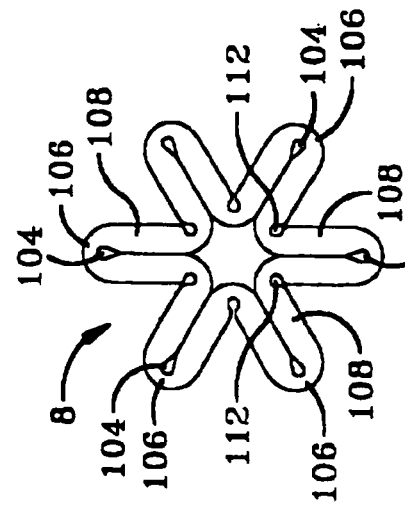
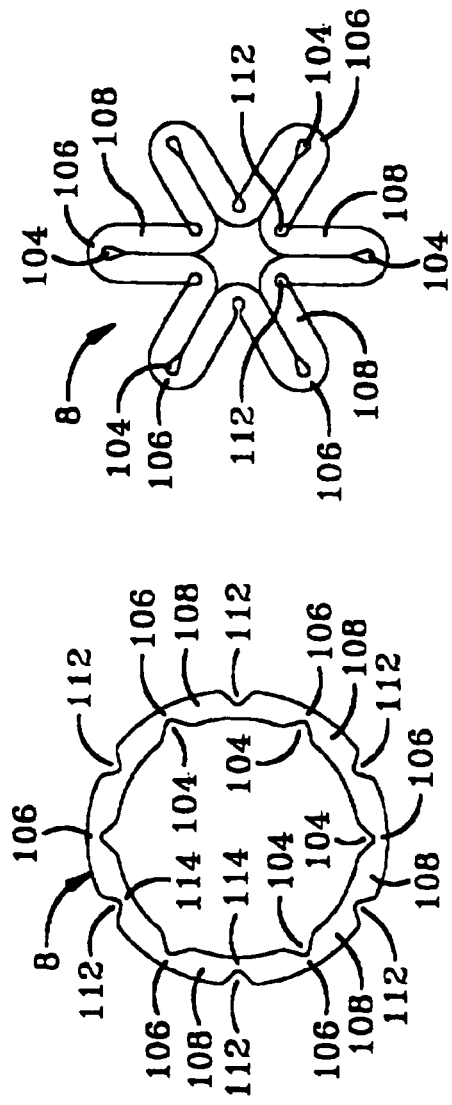
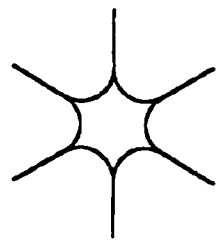

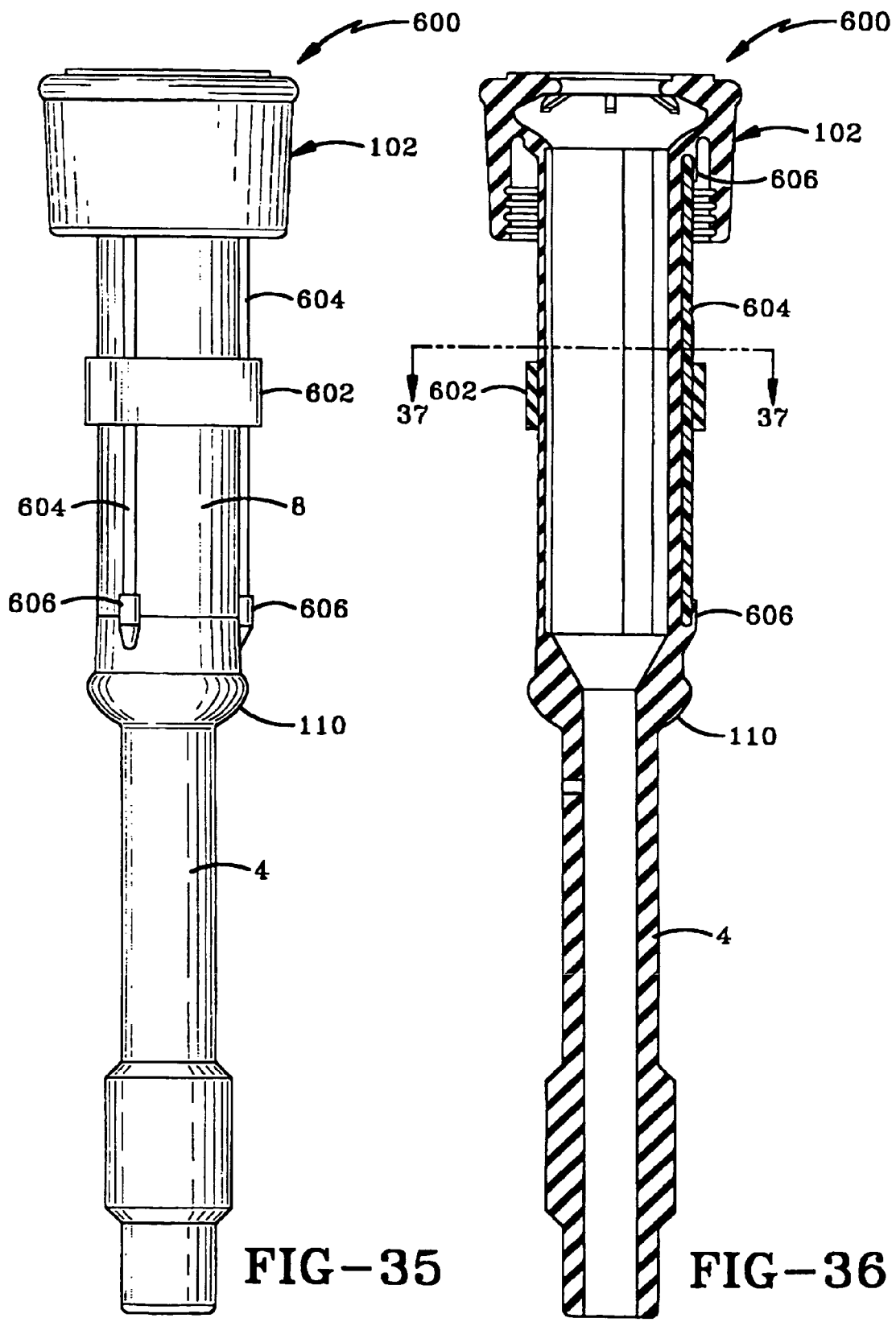

MILKING LINER

CROSS REFERENCE TO RELATED APPLICATIONS

This application claims priority from U.S. provisional patent application Ser. No. 60/583,705 filed Jun. 29, 2004 and U.S. provisional patent application Ser. No. 60/683,277 filed May 20, 2005; the disclosures of both are incorporated herein by reference.

BACKGROUND OF THE INVENTION

1. Technical Field

This invention generally relates to milking liners.

2. Background Information

Automatic milking machines have been used to extract milk from different mammals through most of the past century. Most of these machines include a claw that typically has four nipples that are connected to teat cup assemblies that are attached to the teats. The teat cup assemblies include a rigid (hard plastic or metal) shell with a resilient milking liner (also known as a milking inflation) disposed within the shell. A short milk tube extends from the liner. A vacuum source is applied to the short milk tube and an alternating vacuum is applied to the shell to cause the liner inside the shell to collapse and expand and thereby massage and suck milk from the teats. The milk flows from the liners, into the short milk tube, to the nipples of the claw, and from there through a conduit to a collection tank.

The liner is one of the few components of an automatic milking machine that comes into direct contact with the animal. Liners have to collapse and expand to massage the teat to cause milk to flow. Numerous milking inflation designs have been developed for collapsing on the teat in different manners. The art desires an inflation having an open, relatively large, readily collapsible sleeve that uniformly collapses around the teat to provide effective and comfortable milking. The structure of the sleeve should provide a reliable collapsing configuration and a long useful life. Liners that collapse and expand slowly are undesirable. Liners that pinch or otherwise irritate the teat are also undesirable.

Another problem with existing liners is the tendency for the short milk tube to tear when the liner is removed from the teat and left to hang from the claw nipple by the short milk tube. When left to hang from the claw, the short milk tube is bent against the tip of the claw nipple causing the claw nipple to press into the inner surface of the short milk tube. In this position, the claw nipple can damage and eventually tear into the inner surface of the short milk tube. The damage and tearing is hastened when the hanging liners are jostled or unintentionally pulled from the milk claw in a direction that peels the short milk tube from the connector tube. The art desires a short milk tube design that resists damage and tearing

SUMMARY OF THE INVENTION

In one configuration, the invention provides a milking liner for an automated milking machine having a shell wherein the milking machine periodically subjecting the liner to a vacuum milking condition. The milking liner includes a barrel that moves between an uncollapsed position and a collapsed condition when it is subjected to a vacuum milking condition. The barrel defines at least three parallel channels open to the inner surface of the barrel. The configuration of the sidewall of the barrel and the channels cause the barrel to uniformly collapse when the barrel is subjected to a vacuum milking condition.

In another configuration, the invention provides a milking liner that is adapted to engage the shell at its upper and lower ends while being free of interconnections with the shell between the upper and lower ends of the barrel. The barrel defines three ribs that are each parallel to the longitudinal axis of the barrel with each rib defining a channel that is open to the inner surface of the barrel. The barrel also defines three semi-circular sidewall segments that each have a constant thickness. Each pair of semi-circular sidewall segments is separated from each other by a rib. Each rib has an inner surface and an outer surface that define a rib thickness with the rib thickness being equal to the thickness of the sidewall segments. The sidewall segments are movable between uncollapsed and collapsed conditions with the sidewall segments moving to the collapsed condition during a vacuum milking condition. The sidewall segments are bowed outwardly to generally define a circle when the segments are in the uncollapsed condition and each of the sidewall segments is bowed inwardly in the collapsed condition.

The invention also provides a configuration for a short milk tube wherein an internal or external sleeve is used to reinforce the short milk tube against tearing.

The invention also provides a configuration for a short milk tube wherein ribs are used to prevent the tube from collapsing and/or to prevent the vent plug from being unintentionally forced from the short milk tube.

The invention also provides a configuration for a mouthpiece flange wherein ribs are used to seal the connection between the flange and the shell.

In another configuration, the invention provides a barrel for a milking liner wherein the sidewall defines both interior and exterior channels that create hinges to allow the sidewall of the liner to uniformly collapse.

In another configuration, the invention provides a barrel for a milking liner wherein the sidewall defines hinge areas formed from a material different than the material of the sidewall segments to allow the sidewall of the liner to uniformly collapse.

In another configuration, the invention provides a barrel for a milking liner wherein loaded transition areas at the top and bottom of the barrel force the sidewall to collapse into a uniform collapsed condition.

In another configuration, the invention provides a barrel for a milking liner wherein a band is disposed around a middle portion of the barrel to predefine the manner in which the barrel will collapse when subjected to a vacuum milking condition.

In another configuration, the band is combined with rods disposed along the outside of the barrel.

These configurations have been found to be useful alone or in combination.

BRIEF DESCRIPTION OF THE DRAWINGS

FIG. 3A is an elevation view of another exemplary milking liner configuration.

FIG. 3B is a section view taken along line 3B-3B of FIG. 3A.

FIG. 3C is a perspective view of a short milk tube sleeve used with the liner configuration of FIG. 3B.

FIG. 4 is a section view taken along line 4-4 of FIG. 1 showing an exemplary connection between a short milk tube sleeve and a short milk tube.

FIG. 7 is an elevation view of another exemplary configuration of a milking liner.

FIG. 8 is a longitudinal section view of the liner of FIG. 7.

FIGS. 16A-16D show four different liner wall configurations for a milking liner liner.

FIG. 16E is a schematic view showing how each of the wall configurations of FIGS. 16A-16D collapse.

FIG. 16F is another wall configuration for a milking liner.

FIG. 16G shows the collapsed configuration for the wall configuration of FIG. 16F.

FIGS. 17A-17D show four different liner wall configurations a milking liner.

FIG. 17E is a schematic view showing how each of the wall configurations of FIGS. 17A-17D collapse.

FIG. 17F is another wall configuration for a milking liner.

FIG. 17G shows the collapsed configuration for the wall configuration of FIG. 17F.

FIGS. 18A-18D show four different liner wall configurations for a milking liner.

FIG. 18E is a schematic view showing how each of the wall configurations of FIGS. 18A-18D collapse.

FIG. 18F is another wall configuration for a milking liner.

FIG. 18G shows the collapsed configuration for the wall configuration of FIG. 18F.

FIG. 35 is an elevation view of another exemplary configuration of a milking liner.

FIG. 36 is a longitudinal section view of FIG. 35.

The drawings are not to scale. Similar numbers refer to similar parts throughout the specification.

DETAILED DESCRIPTION OF THE INVENTION

Figure 1:
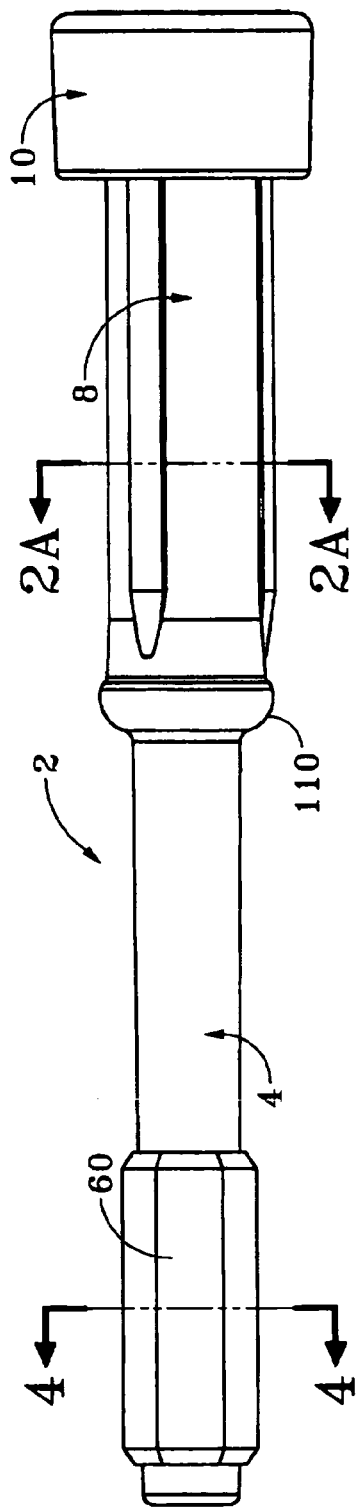
FIG. 1 is an elevation view of one exemplary milking liner configuration.
Figure 2B:
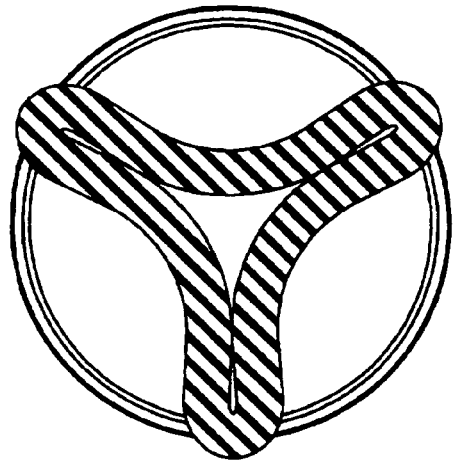
FIG. 2B is a view showing the liner section of FIG. 2A in a collapsed condition.

An exemplary milking liner configuration is indicated generally by the numeral 2 in FIG. 1. Milking liner 2 generally includes a short milk tube 4, a sleeve or barrel 8 that is connected to short milk tube 4, and a mouthpiece 10. Barrel 8 is configured to quickly and uniformly collapse during a vacuum milking condition (where the pressure inside the barrel is significantly less than outside the barrel) from an uncollapsed (or expanded) condition to a collapsed condition. Barrel 8 uniformly collapses as shown in FIG. 2B without interconnections with the shell 136 so that liner 2 may be used with a wide variety of existing shells already used in the industry. A barrel configuration that collapses uniformly (as shown in FIG. 2B and FIGS. 13-15) about a teat is desirable because a uniformly collapsing barrel 8 efficiently draws milk from the teat and causes less irritation to the animal being milked. In the context of this application, a uniformly collapsing barrel is one having at least three sidewall portions that move inwardly to engage the teat at the collapsed condition. Exemplary uniformly collapsed constructions are shown in at least FIGS. 2B, 15, 16G, 17G, 18G, and 21.

Figure 2A:
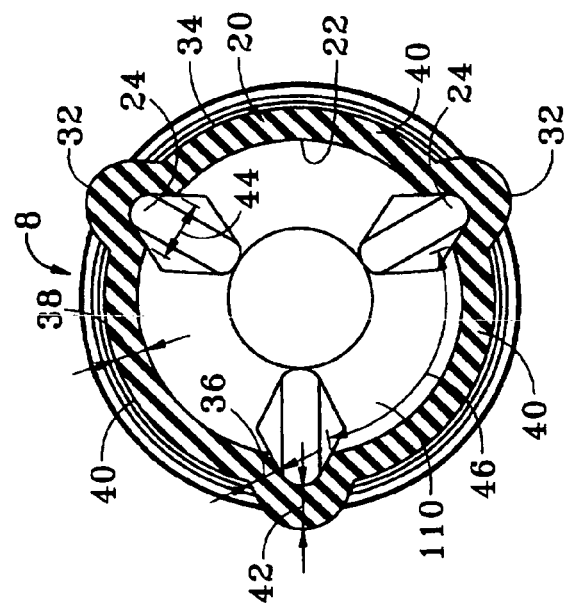
FIG. 2A is a section view taken along line 2A-2A of FIG. 1.

In order to uniformly and reliable collapse from the resting uncollapsed position (FIG. 2A) to the collapsed condition (FIG. 2B), barrel 8 includes a sidewall 20 having an inner surface 22 that defines at least three longitudinally-disposed channels 24 that each extend substantially from mouthpiece 10 to transition bead 110. Each channel 24 may taper as it approaches each end. Each channel 24 stops short of transition bead 110 but may extend through mouthpiece bead 26. The depth of each channel 24 may be lessened as it passes through mouthpiece bead 26. When channels 24 pass through or partially through bead 26, the thick bead portions 28 disposed intermediate each pair of channels 24 help to bias sidewall 20 into collapsing into the desirable even collapse.

In some configurations, each channel 24 may have a depth that is less than the thickness of sidewall 20 as shown in FIGS. 15-18. In other configurations, each channel 24 may have a depth equal to or larger than the thickness of sidewall 20. In these configurations, ribs 32 extend outwardly from the outer surface 34 of sidewall 20 to provide room for channels 24. In the exemplary configuration depicted in FIG. 2A, each rib 32 extends far enough outwardly to allow the wall thickness 36 of rib 32 to at least equal the wall thickness 38 of the sidewall segments 40 disposed intermediate each pair of ribs 32. The thickness of each rib 32 may be form to be still thicker from a dimension equal to sidewall thickness 38 to an apex thickness 42 disposed at the outermost portion of rib 32. The extra thickness at apex thickness 42 increases the useful life of liner 2.

In one exemplary configuration that has been found to uniformly collapse, each of the three sidewall segments 40 is semi-circular and substantially equal in thickness, diameter, and arc length. In the collapsed condition, each of segments 40 is flexed inwardly of its circular resting position. When there is no teat in liner 2, each segment 40 is bowed outwardly in the resting position and bowed inwardly in the collapsed condition. When a teat is disposed in liner 2, each of segments 40 may be bowed inwardly depending of the size of the teat. Thicknesses 36 and 38 are 2.50 mm while each arc dimension 46 taken along inner surface 22 is 15.32 mm. The radius of inner surface 22 is 10.80 mm. In this configuration, the three segments comprise 68% of the inner circumference (67.86 mm). Segment configurations of 58% to 78% of the circumference will also allow the liner to collapse. Three ribs 32 are equally disposed about sidewall 20 with the depth (3.69 mm) of each channel 24 being larger than thickness 38 of segments 40. The depth of each channel 24 may be in the range of 140% to 160% of sidewall thickness 38. Each channel has a rounded bottom. Each apex thickness 42 (4.27 mm) is larger than thickness 36 of the rib walls. The arc opening 44 (7.3 mm) of each channel 24 is 37% to 57% and more preferably between 42% and 52% of the arc length 46 of each sidewall segment 40.

In the exemplary milking liner configuration of FIG. 1, a short milk tube sleeve 60 has been separately formed and then slid onto short milk tube 4. Interlocking fingers 62 alone or in combination with an adhesive are used to secure sleeve 60 in place. Sleeve 60 may be fabricated from a different material than short milk tube 4 in order to help prevent tube 4 from tearing against the nipple 96 (FIGS. 6 and 41) on the milking claw 98. For example, sleeve 60 may be fabricated from a significantly harder material (such as PVC) than short milk tube 4.

FIGS. 3A-3C depict another configuration wherein sleeve 60 is fit over a section of short milk tube 4. Sleeve 60 may be held in place with an adhesive or with shoulders that protrude outwardly from tube 4. Short milk tube 4 may also have an inset section 64 that defines shoulders 66 that secure sleeve 60 in place on short milk tube 4. Inset section may be formed with a non-circular cross section as shown, for example, in FIG. 3B to prevent sleeve 60 from rotating with respect to milk tube 4.

Figure 5:
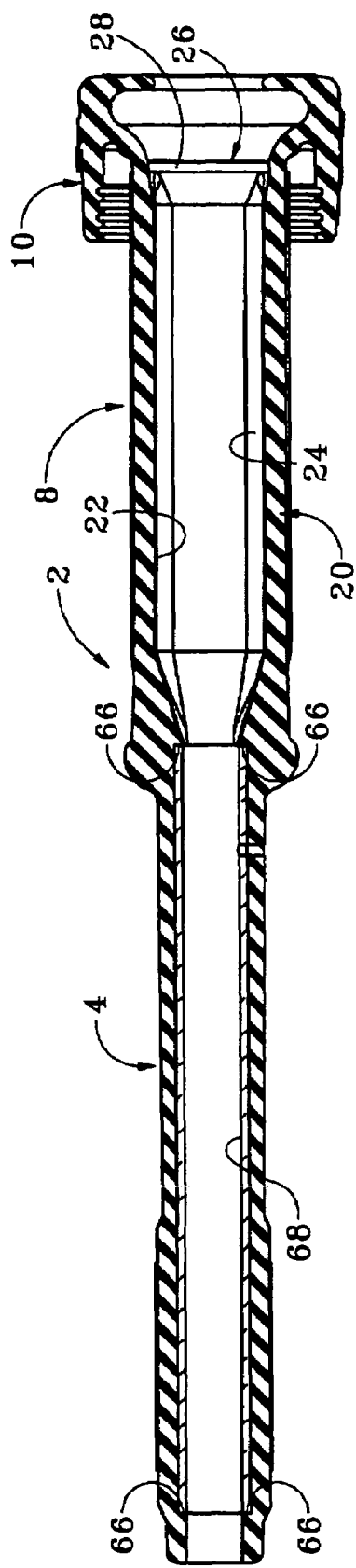
FIG. 5 is a longitudinal section view of another exemplary configuration for a milking liner.
Figure 5A:
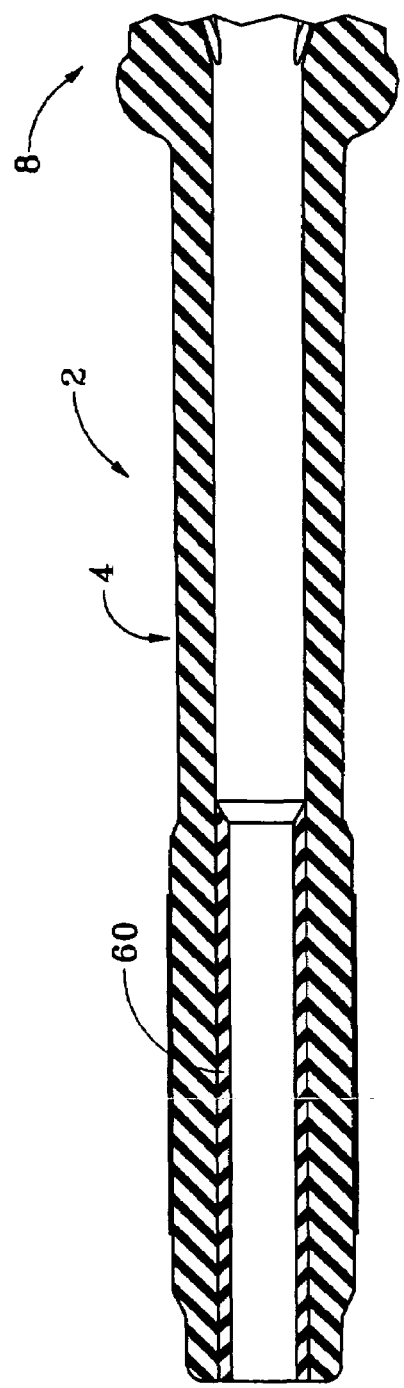

FIG. 5 depicts an embodiment wherein short milk tube 4 defines a pair of opposed shoulders 66 that trap an internal sleeve 68 that is used to strengthen milk tube 4. Sleeve 68 may be slid into the end of short milk tube 4 by stretching the opening at the end of tube 4 over sleeve 68 and sliding sleeve 68 into tube 4 until sleeve 68 abuts the shoulder 66 distal from the opening of tube 4. Sleeve 68 may be disposed along most of the length of short milk tube 4 as shown in FIG. 5. Sleeve 68 optionally may be disposed only toward the thickened tip of tube 4 such that sleeve 68 receives nipple 96. When configured as shown in FIG. 5, sleeve 68 may be rigid or may be flexible to allow short milk tube to bend up to 90 degrees.

Figure 6:
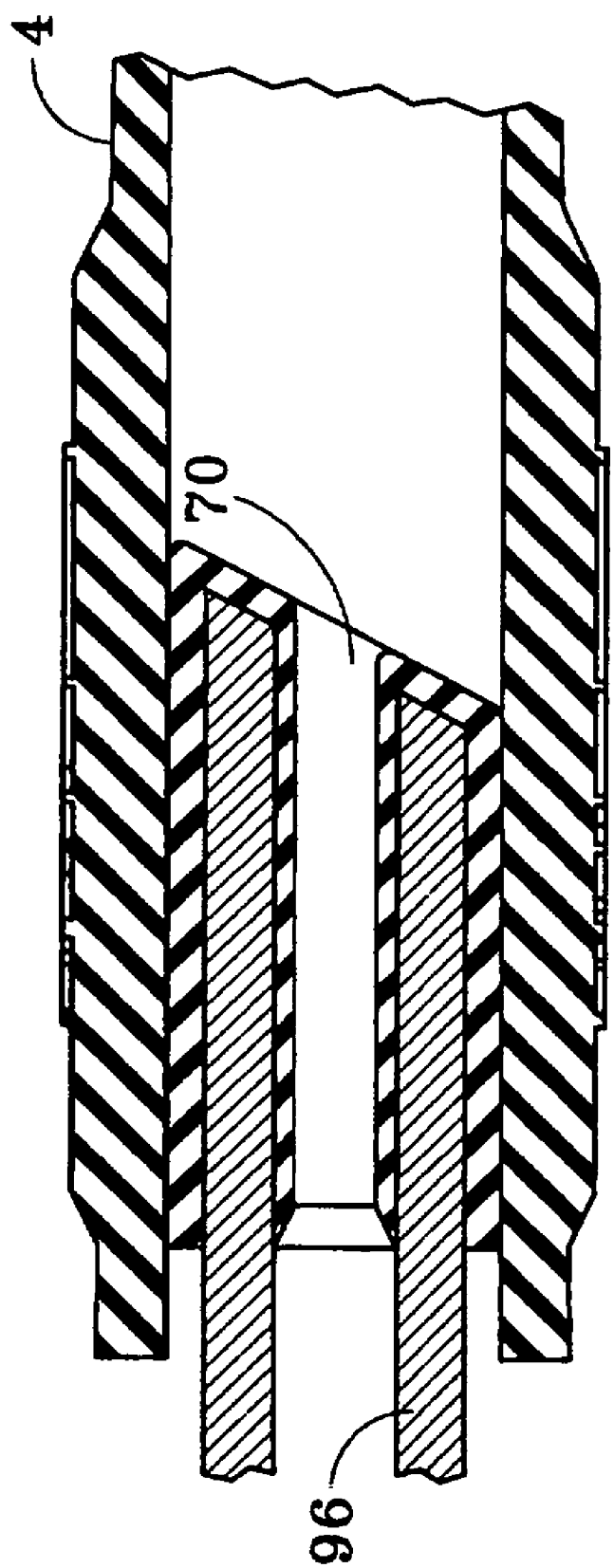
FIG. 6 is an enlarged longitudinal section view of a milking claw nipple disposed inside the end of a short milk tube.
Figure 9:
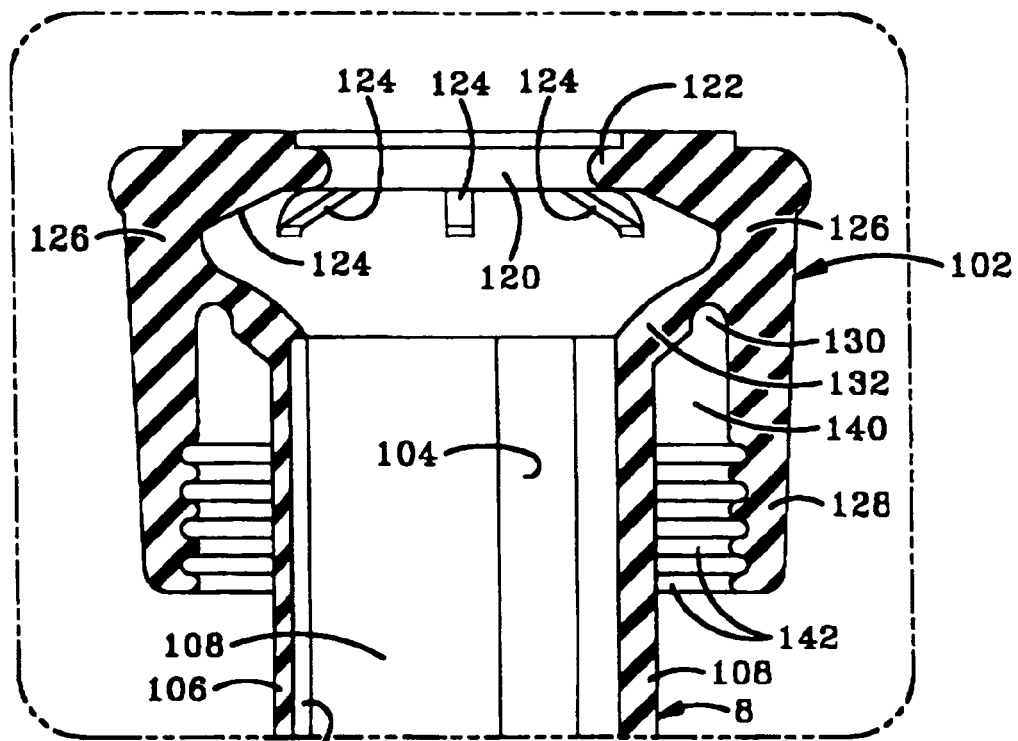
FIG. 9 is an enlarged view of the encircled portion of FIG. 8.

FIG. 6 depicts another configuration for protecting short milk tube 4 wherein nipple 96 is coating with a rubber, elastomeric, or plastic cap 70 that prevents the sharp end of nipple 96 from directly engaging the inner surface of short milk tube 4. Cap 70 may be removably connected to nipple 96. Cap 70 may also be adhered to nipple 96 or provided in the form of a coating.

Figure 11:
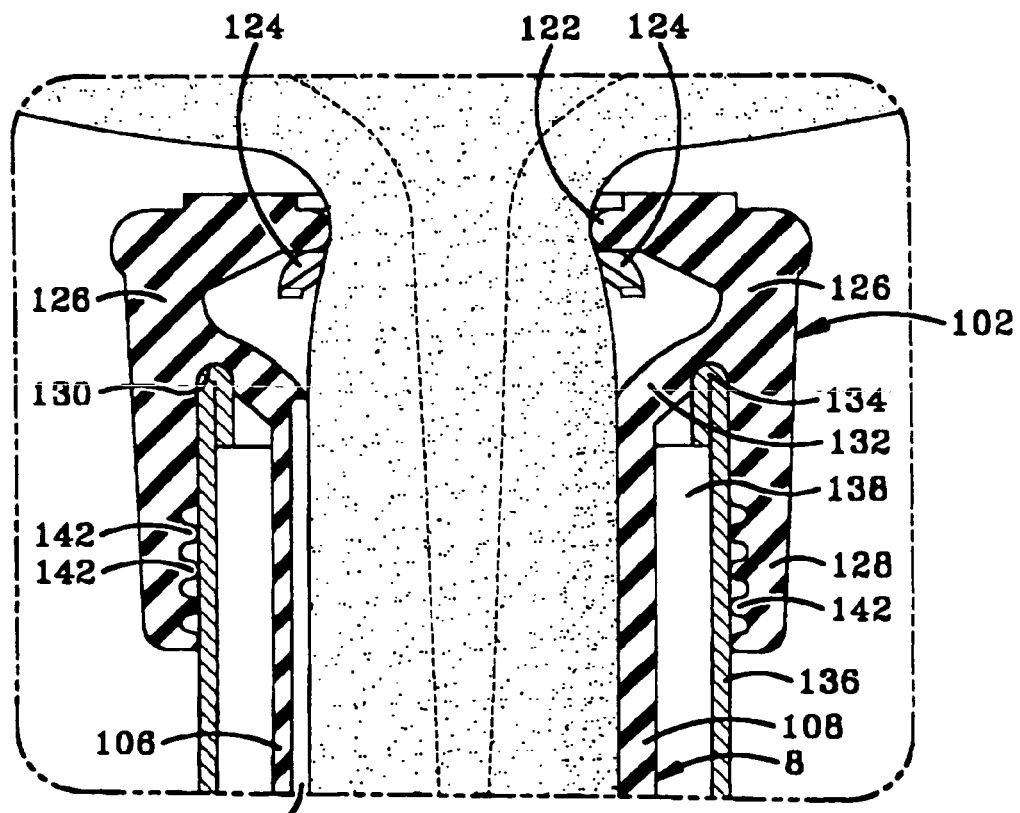
FIG. 11 is an enlarged view of the encircled portion of FIG. 10.
Figure 10:
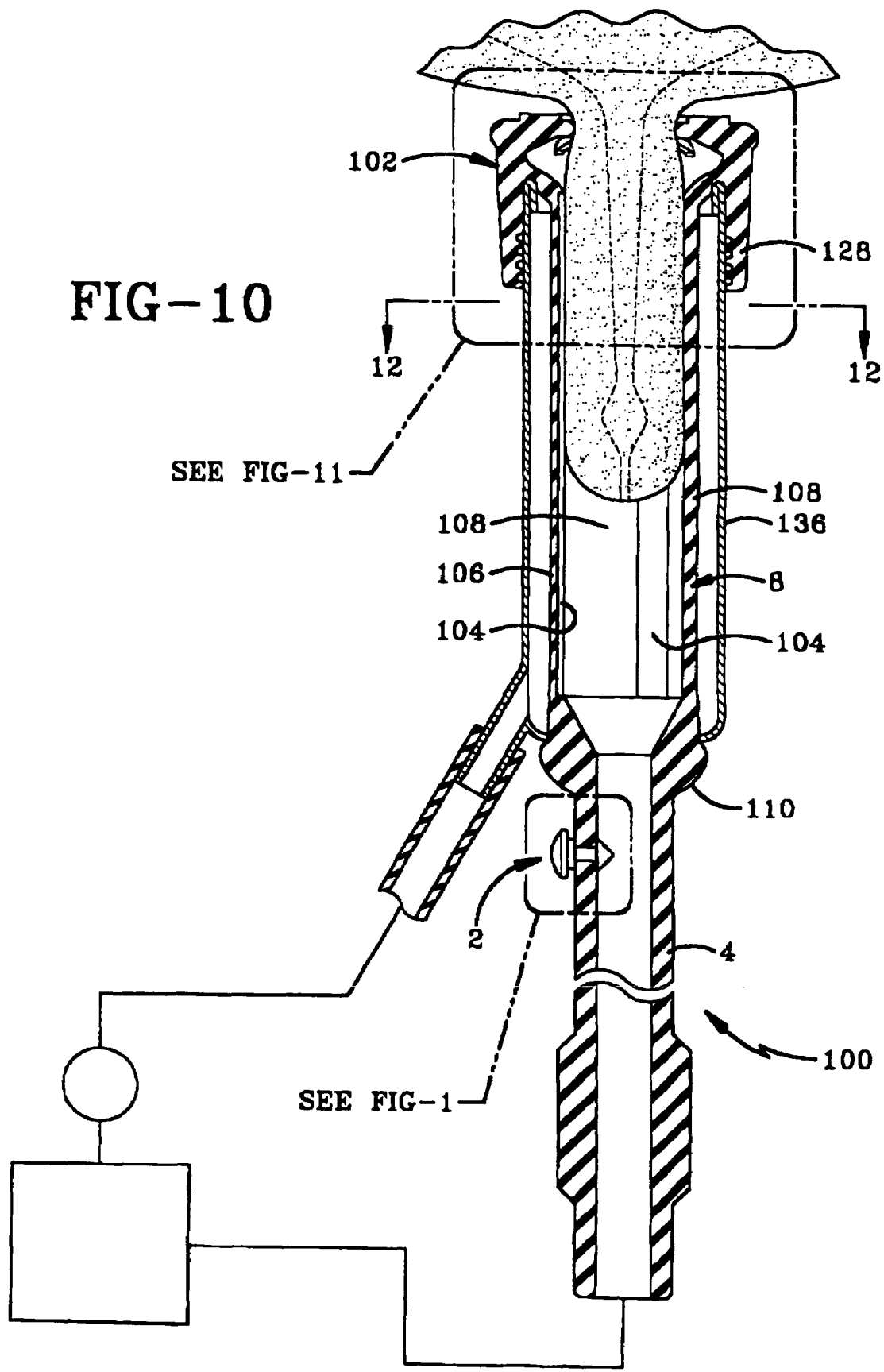
FIG. 10 is a section view similar to FIG. 8 showing the liner disposed in a teat cup assembly with the liner positioned on a teat in an uncollapsed configuration.
Figure 12:
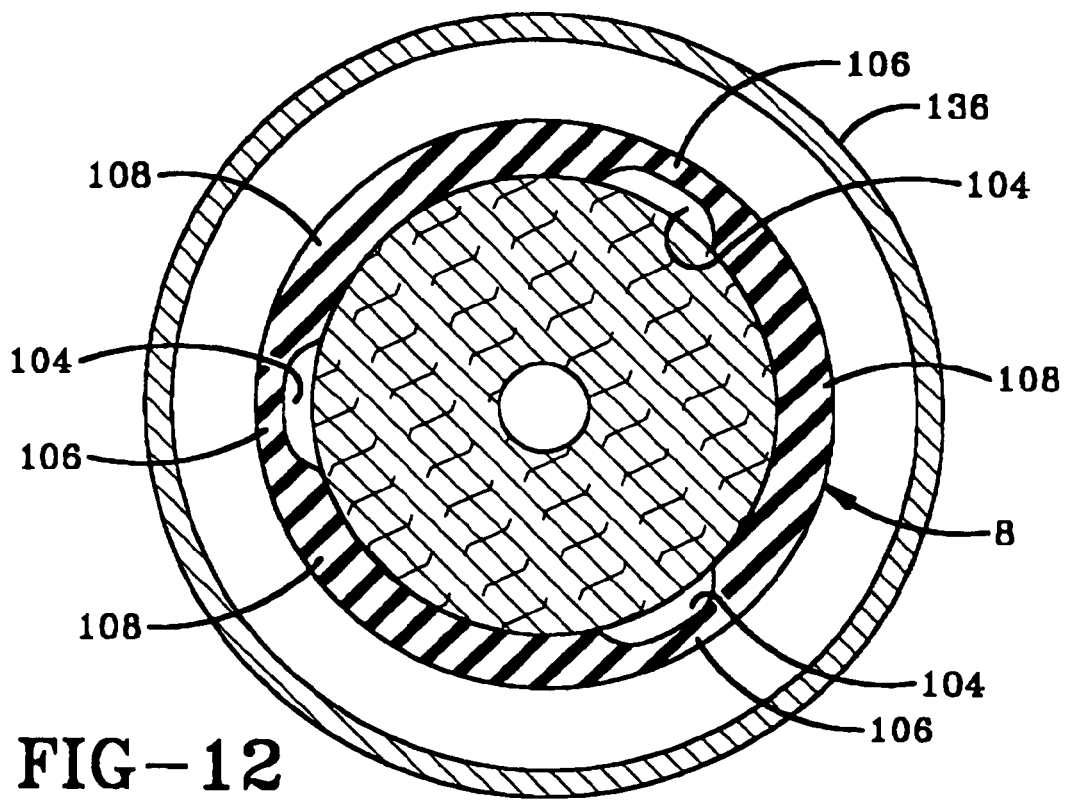
FIG. 12 is a section view taken along line 12-12 of FIG. 10.
Figure 14:
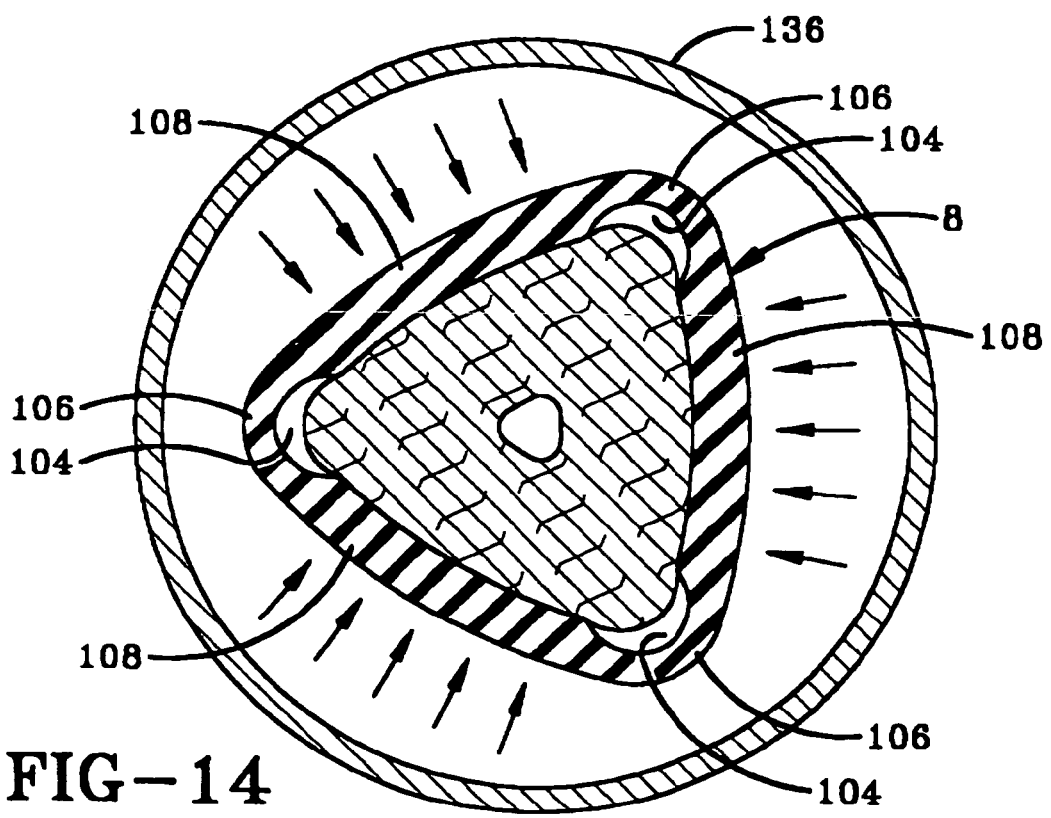
FIG. 14 is a section view taken along line 14-14 of FIG. 13.
Figure 13:
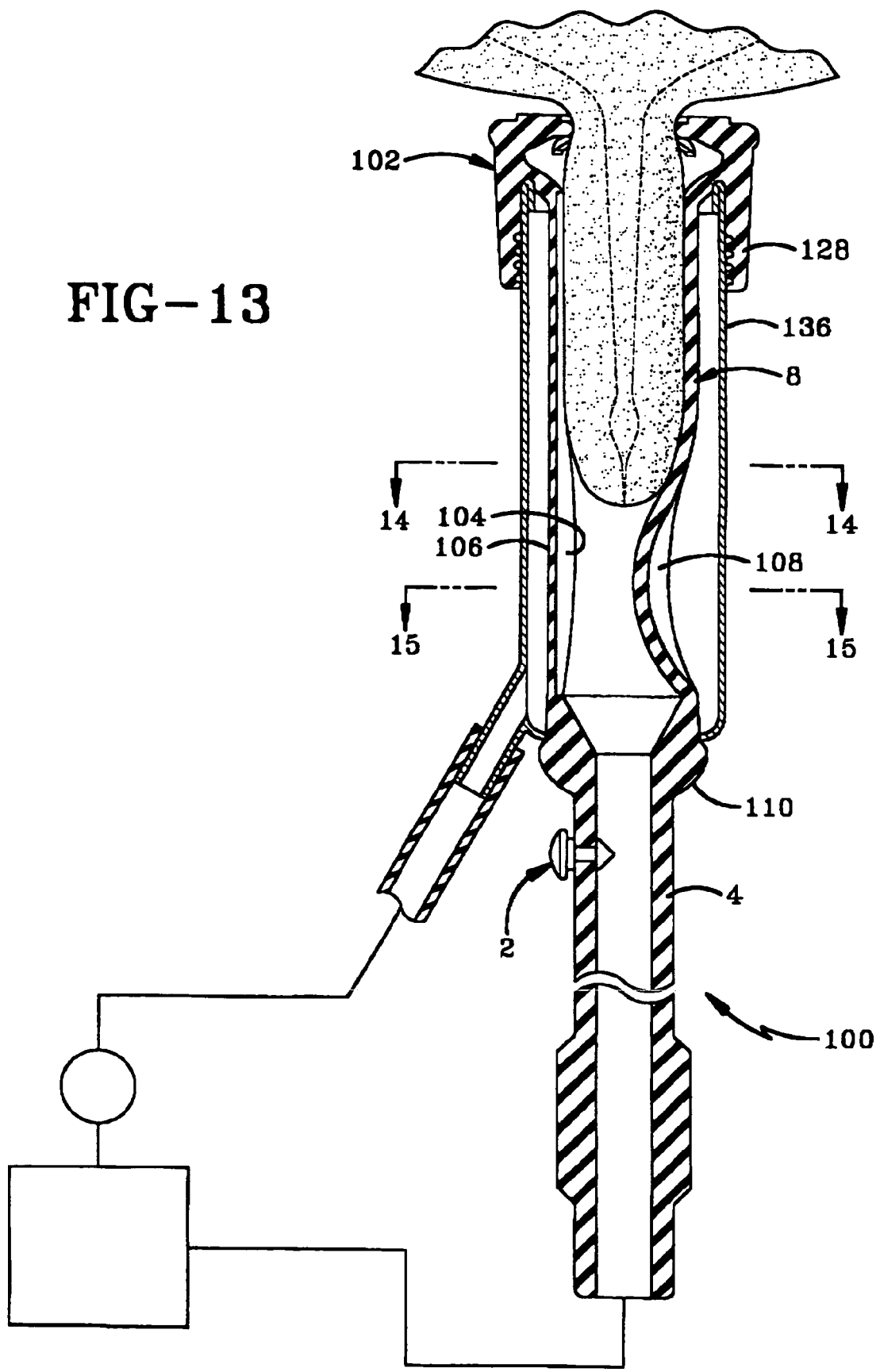
FIG. 13 is a view similar to FIG. 10 showing a collapsed configuration for the liner.
Figure 15:
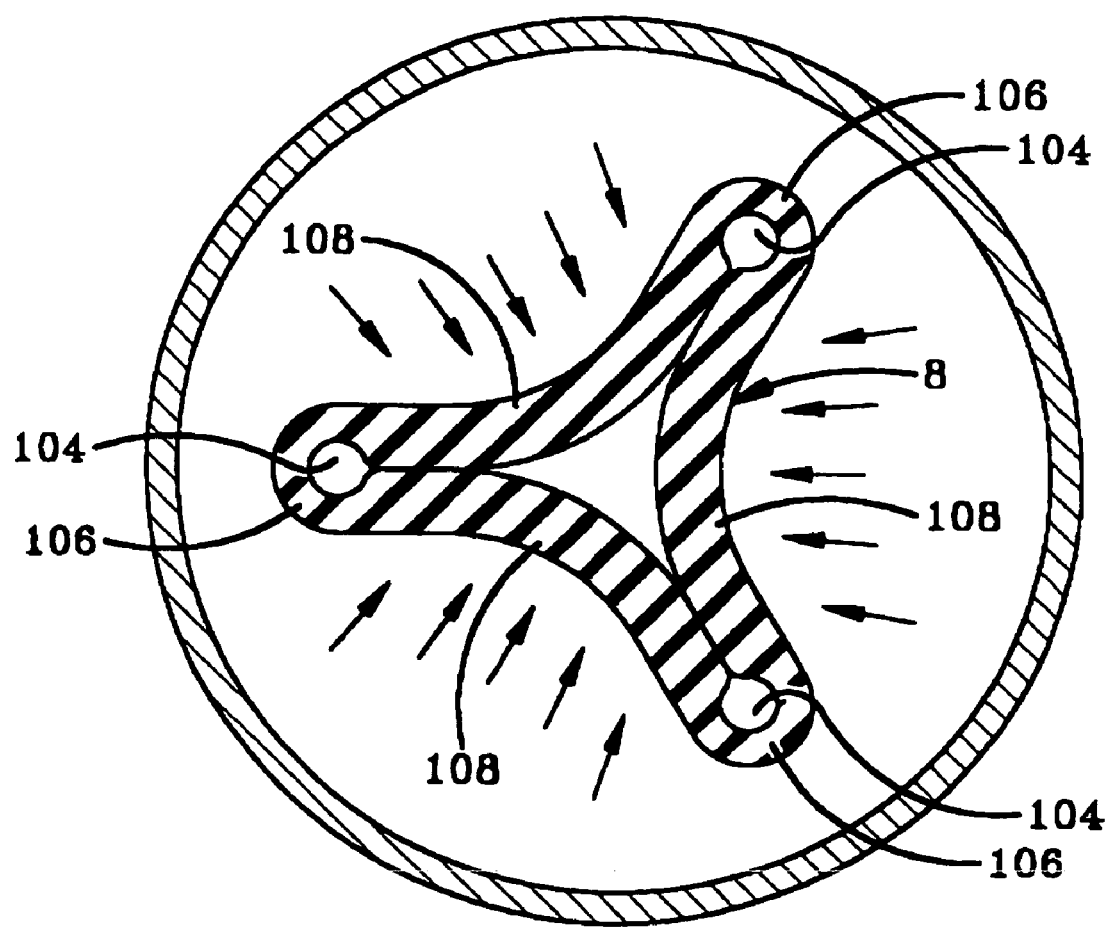
FIG. 15 is a section view taken along line 15-15 of FIG. 13.

Another configuration for a milking liner is indicated generally by the numeral 100 in FIGS. 7-15. As described above, liner 100 generally includes sleeve 8 connected to short milk tube 4 on one end and a mouthpiece 102 at the other end of sleeve 8. Sleeve 8 is configured to quickly and uniformly collapse about the teat in the collapsed position and then readily expand back to the uncollapsed position. In this configuration, sleeve 8 defines three equally-spaced, longitudinally-disposed channels 104 that create weakened areas that function as hinges 106 for the sidewall of sleeve 8. The weakened areas 106 act as hinges when sleeve 8 is collapsed such that the sidewall portions 108 of sleeve 8 between channels 104 pivot with respect to each other about weakened areas 106 so that the collapsed configuration of sleeve 8 is predictable and uniformly distributed about the teat as shown in FIG. 14. This sleeve configuration provides an open uncollapsed configuration as shown in FIGS. 8 and 12 in order to provide ample room for the teat insertion while also providing a fully and uniformly collapsed configuration as shown in FIGS. 13-15.

Each channel 104 may be substantially C-shaped and open to the inner surface of sleeve 8. Each channel 104 extends from mouthpiece 102 to a transition bead 110 that connects sleeve 8 to short milk tube 4.

FIGS. 16A-16D show additional configurations for sleeve 8. FIG. 16A is the same configuration shown in FIGS. 7-15. FIG. 16B uses channels 104 having substantially triangular cross-sectional configurations that form smaller hinges 106. In FIG. 16C, interior channels 104 are combined with exterior channels 112 to form hinges 106. In FIG. 16C, both interior channel 104 and exterior channel 112 have substantially triangular cross-sectional configurations. In FIG. 16D exterior channels are used without interior channels 104. In this configuration, exterior channels 112 have the expanded C-shaped cross-section similar to FIG. 16A. Each of these configurations collapses in an even triangular cross-section as shown schematically in FIG. 16E. A further configuration is shown in FIG. 16F wherein exterior channels 112 are offset from and disposed substantially between interior channels 104 such that each sidewall portion 108 is provided with a centrally-disposed hinge 114. The configuration of FIG. 16F collapses in the configuration shown in FIG. 16G.

FIGS. 17A-17G and 18A-18G show a variety of additional configurations for sleeve 8. In FIGS. 17A-17G, four interior channels 104 are used alone or in combination with four exterior channels 112. Four exterior channels 112 may also be used alone. In FIGS. 17E and 17G, the collapsed configuration shows that the four sidewall portions 108 collapse uniformly towards each other from the circular uncollapsed configuration. In FIGS. 18A-18G, six channels are used to create six sidewall portions 108 that collapse inwardly toward each other from the circular uncollapsed configuration.

Mouthpiece 102 includes a mouth opening 120 defined by a lip 122 that extends circumferentially about opening 120. The diameter of opening 120 is equal to or less than the interior diameter of the upper portion of sleeve 8 so that liner 100 will securely hold itself on the teat as shown in FIG. 11. Mouthpiece 102 includes a plurality of ribs 124 disposed under and radially outwardly of lip 122 to support lip 122. Ribs 124 are smoothly tapered from lip 122 to the outer sidewall 126 of mouthpiece 102. A generally cylindrical flange 128 extends downwardly from outer sidewall 126. Flange 128 defines an annular recess 130 with sidewall 126 and an inner sidewall 132 that is adapted to frictionally receive the top end 134 of shell 136 that forms the vacuum chamber 138 with liner 100. The inwardly facing surface 140 of flange 128 defines a plurality of annular ribs 142 that are formed by a sinusoidal portion of inner surface 140. Ribs 142 cooperate with the outer surface of shell 136 to form a seal and a plurality of pockets to catch any debris that tries to work its way between shell 136 and flange 128. In the exemplary drawings, four ribs 142 are used to create this seal.

Figure 19:
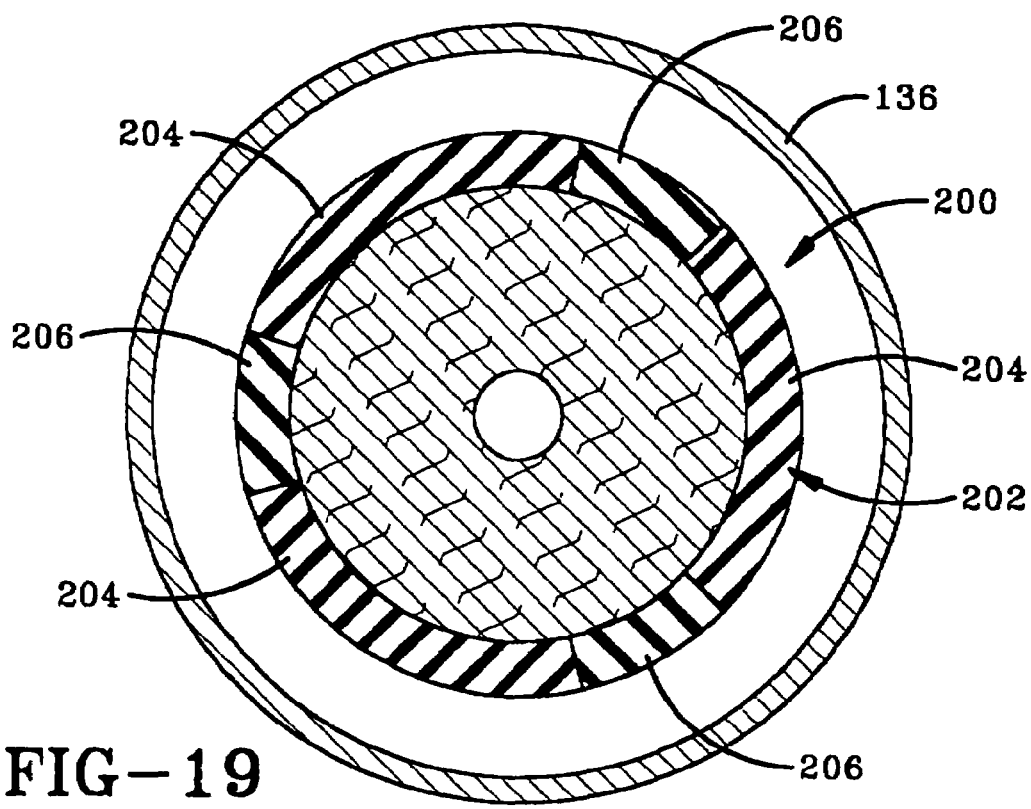
FIG. 19 shows a section view similar to FIG. 12 for another exemplary configuration of a milking liner.
Figure 20:
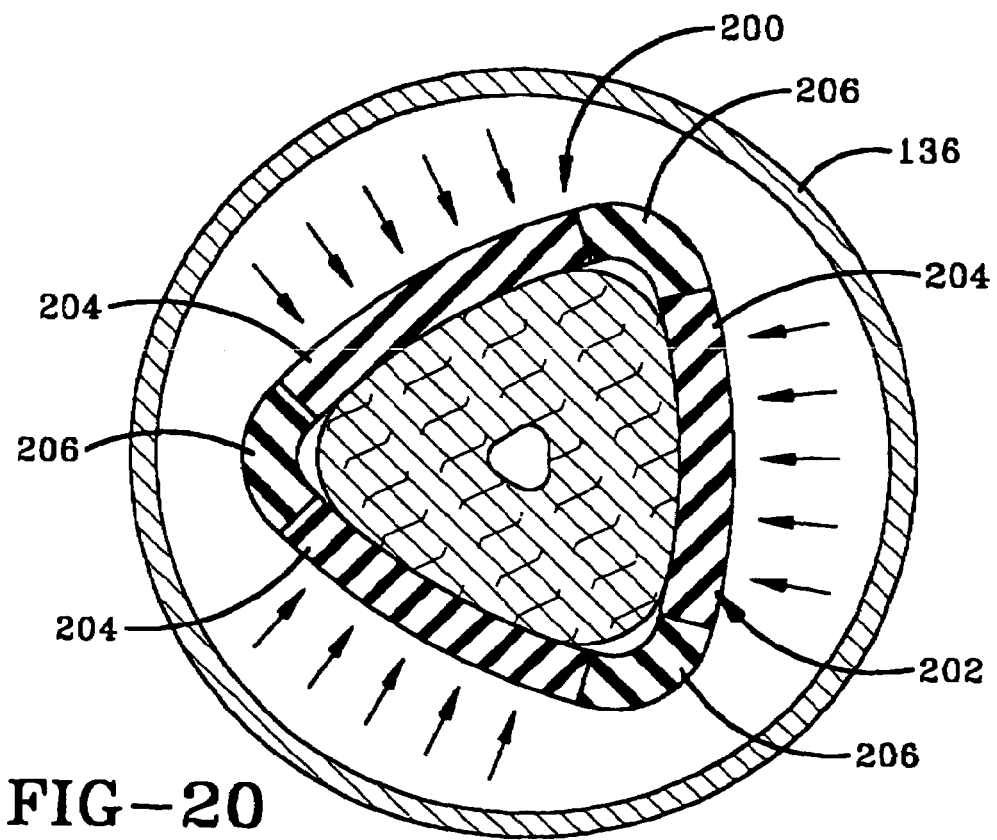
FIG. 20 is a section view similar to FIG. 14 showing the liner of FIG. 19 collapsing on the teat.
Figure 21:
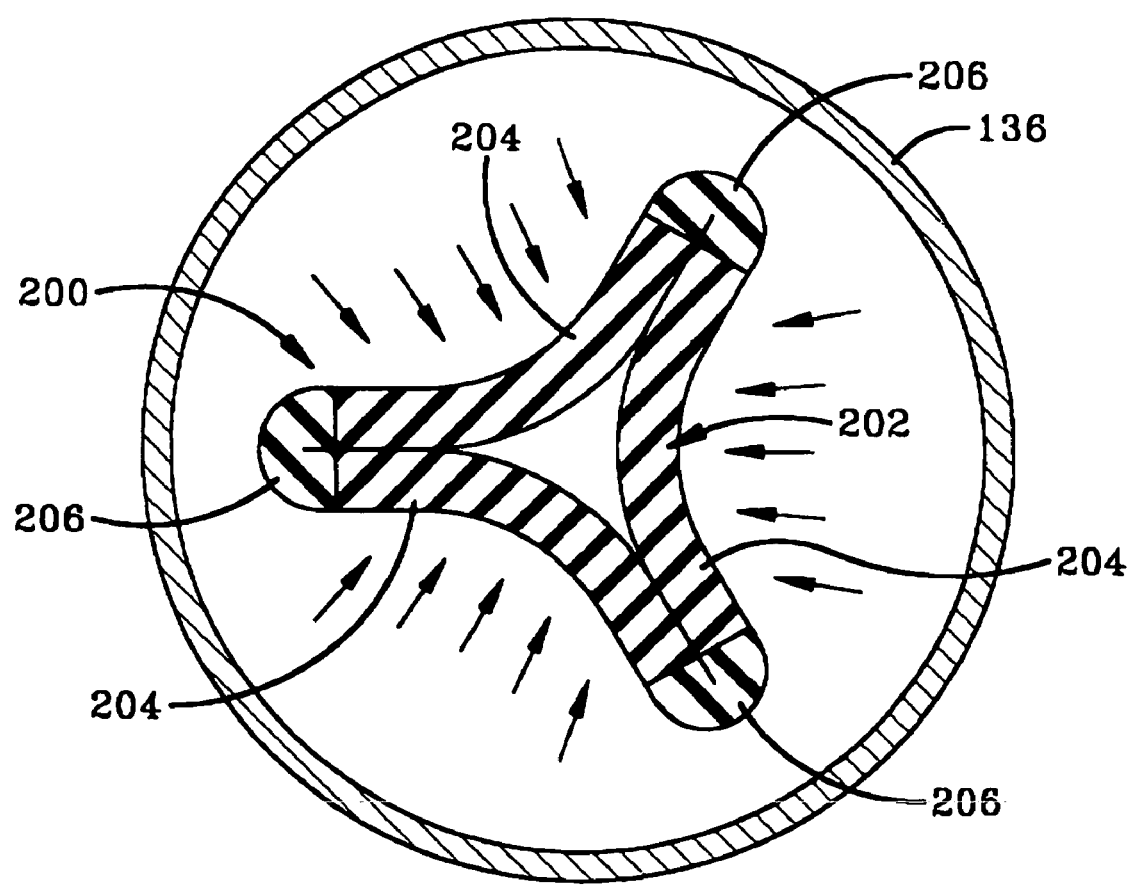
FIG. 21 is a view similar to FIG. 15 showing the liner of FIG. 19 a collapsed configuration.
Figure 22:
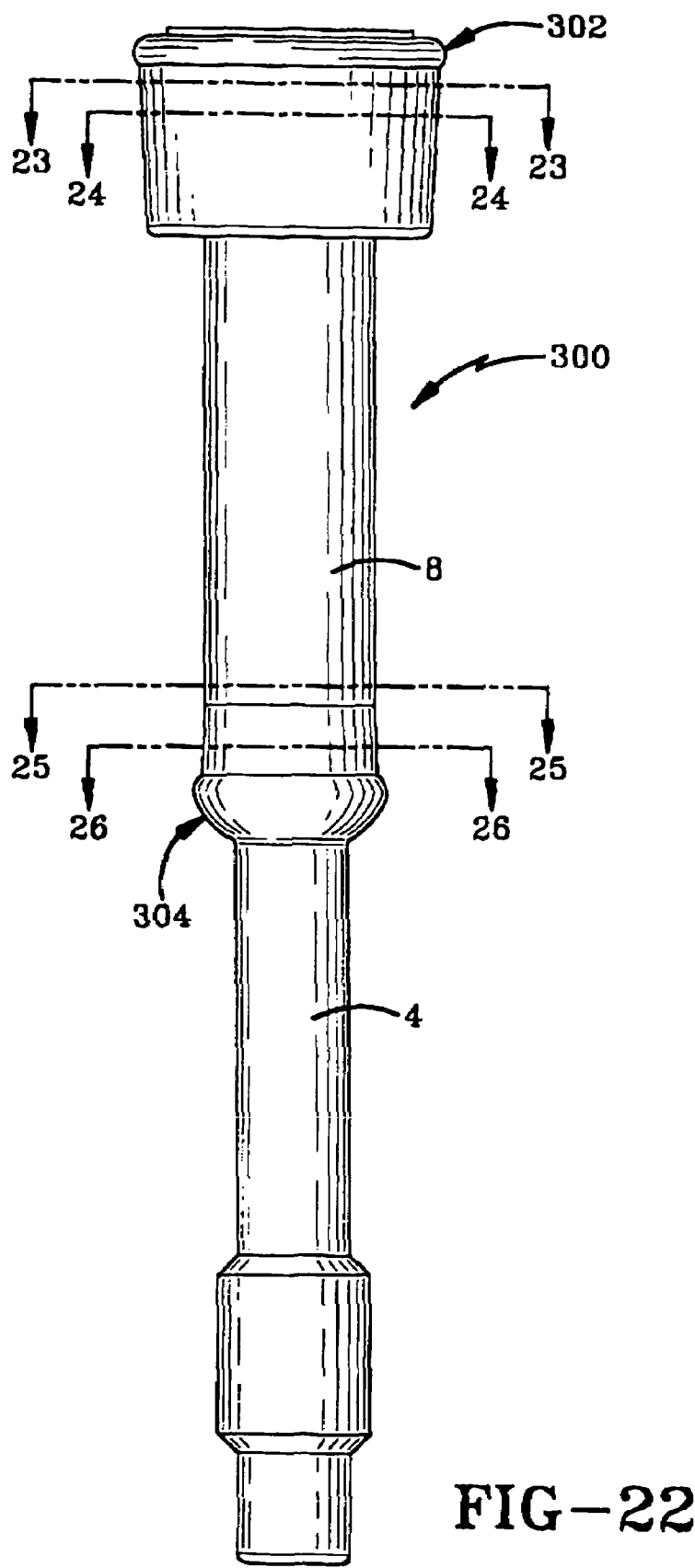
FIG. 22 is an elevation view of another exemplary configuration of a milking liner.
Figure 23:
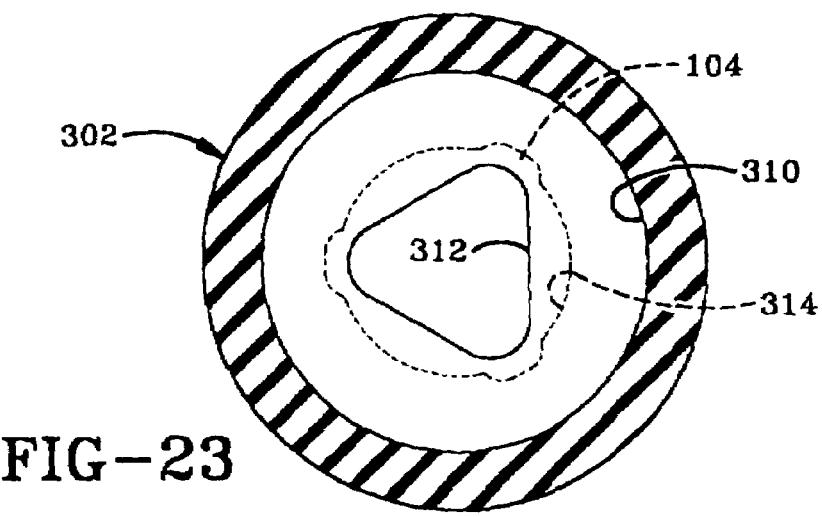
FIG. 23 is a section view taken along line 23-23 of FIG. 22.
Figure 24:
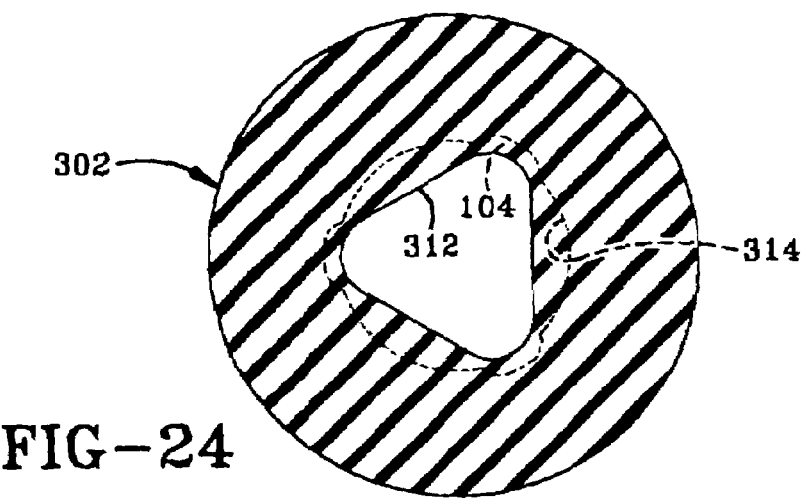
FIG. 24 is a section view taken along line 24-24 of FIG. 22.
Figures 25, 26:
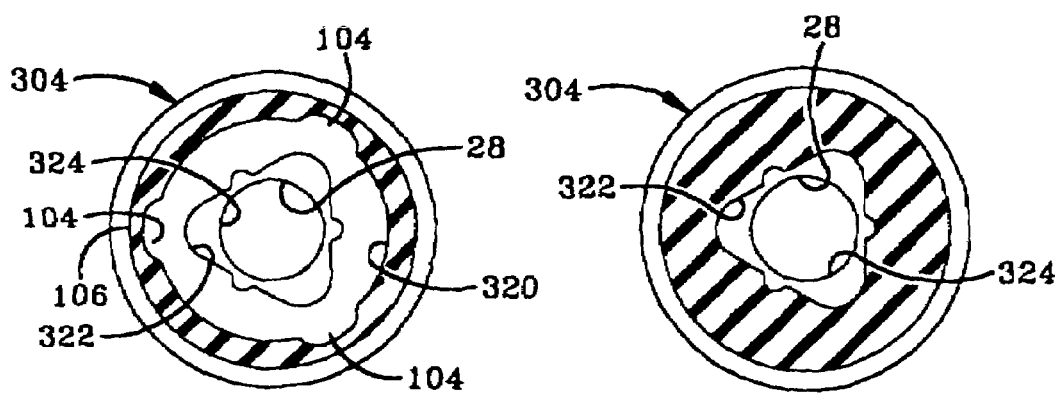
FIG. 25 is a section view taken along line 25-25 of FIG. 22.
FIG. 26 is a section view taken along line 26-26 of FIG. 22.
Figure 27:
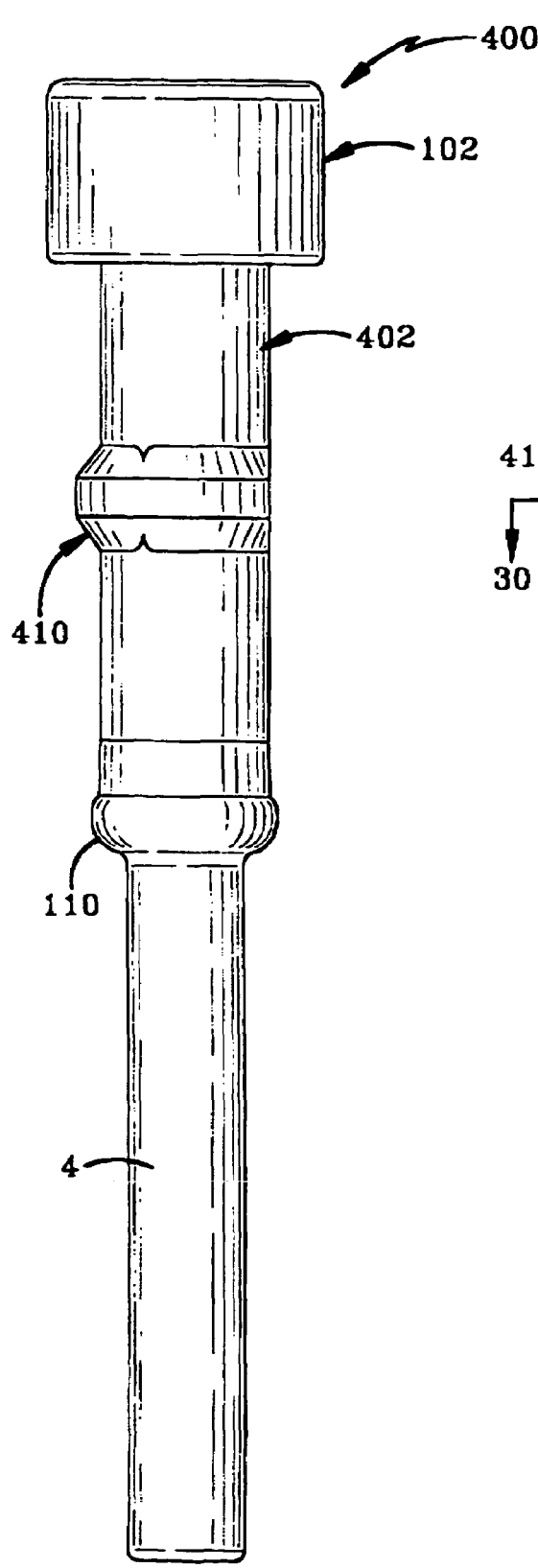
FIG. 27 is an elevation view of another exemplary configuration of a milking liner.

Another configuration of a milking liner is indicated generally by the numeral 200 in FIGS. 19-21. A sleeve 202 is formed with sidewall portions 204 and hinges 206. Hinges 206 are formed from a material that is substantially easier to flex than the material used to form sidewall portions 204 so that sleeve 202 collapses in the predictable configuration shown in FIGS. 20 and 21.

Another configuration of a milking liner is indicated generally by the numeral 300 in FIGS. 22-26. Liner 300 uses a sleeve 8 similar to liner 100 with channels 104 extending longitudinally and defining the hinges and sidewall portions as described above. Liner 300 includes a mouthpiece 302 and a transition bead 304 that have intermediate sidewall portions having cross-sectional configurations that match the hinge configuration of sleeve 8 to help bias sidewall portions 108 inwardly when sleeve 8 is subjected to the vacuum forces that cause it to move from the uncollapsed configuration to the collapsed configuration. In the exemplary embodiment shown in FIG. 22, the intermediate sidewall sections are triangular. When sleeve 8 is formed with four or six hinges 106, the intermediate sidewall portions shown in FIGS. 24 and 26 will be square and hexagonal. The cross-sectional views of FIGS. 23-26 show that the corners of the triangular intermediate sidewall align with channels 104. In mouthpiece 302, the interior sidewall tapers smoothly from a round cross-section at 310 to a triangular cross-section 312 and then back to the round cross-section at 314. Transition bead 304 tapers in a similar manner from a round cross-section at 320 to a triangular cross-section at 322 and then smoothly to a round cross-section at 324 (the inner surface 28 of milk tube 4).

Figure 28:
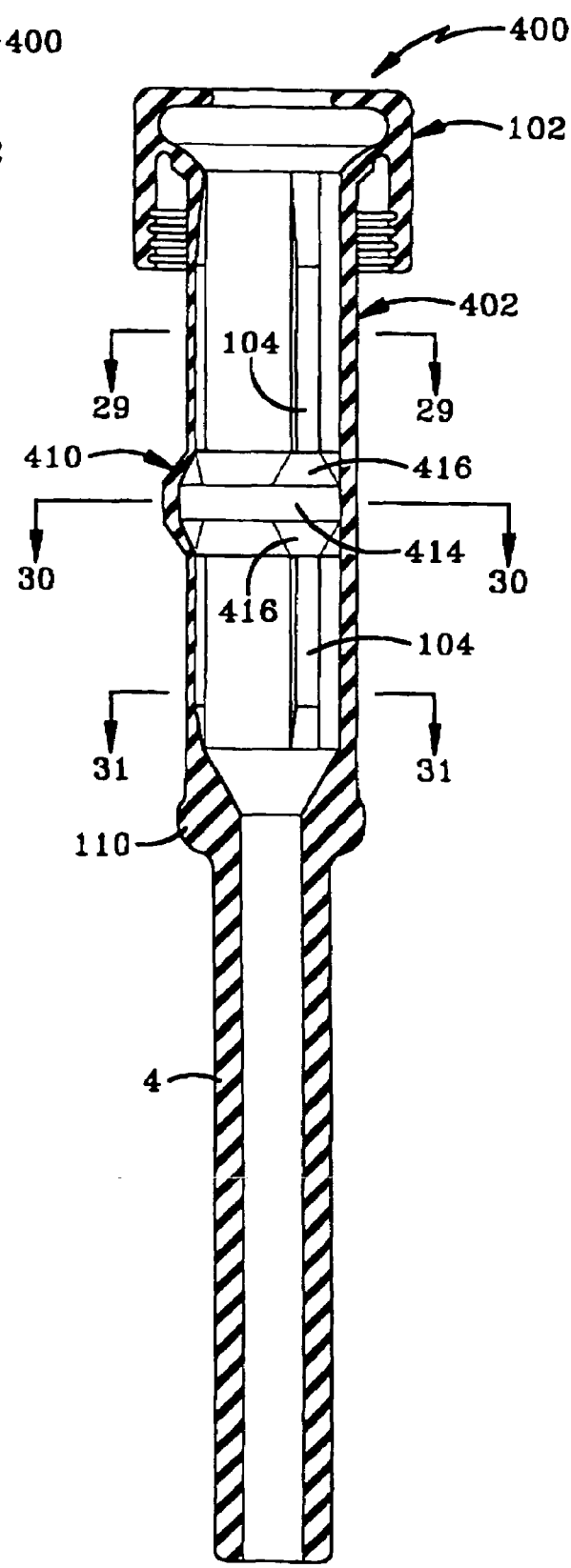
FIG. 28 is a longitudinal section view of FIG. 27.
Figure 29:
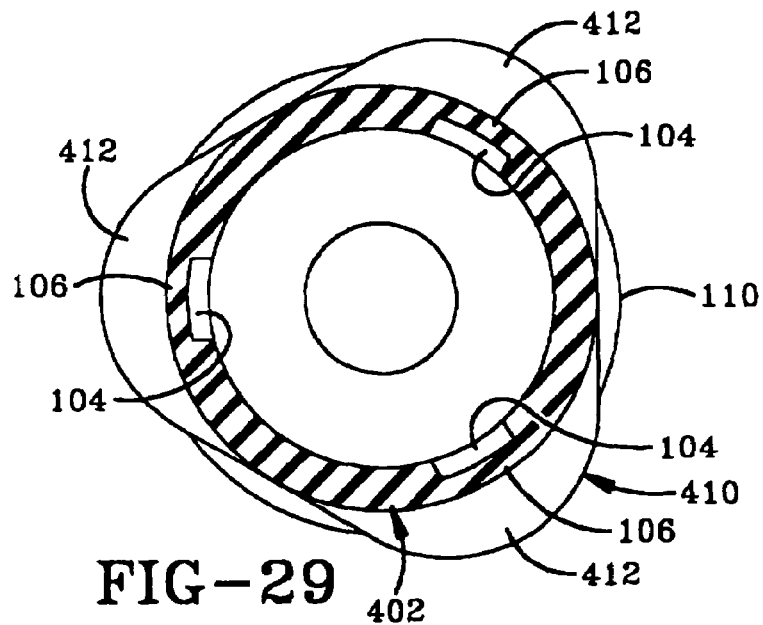
FIG. 29 is a section view of 29-29 of FIG. 28.
Figure 30:
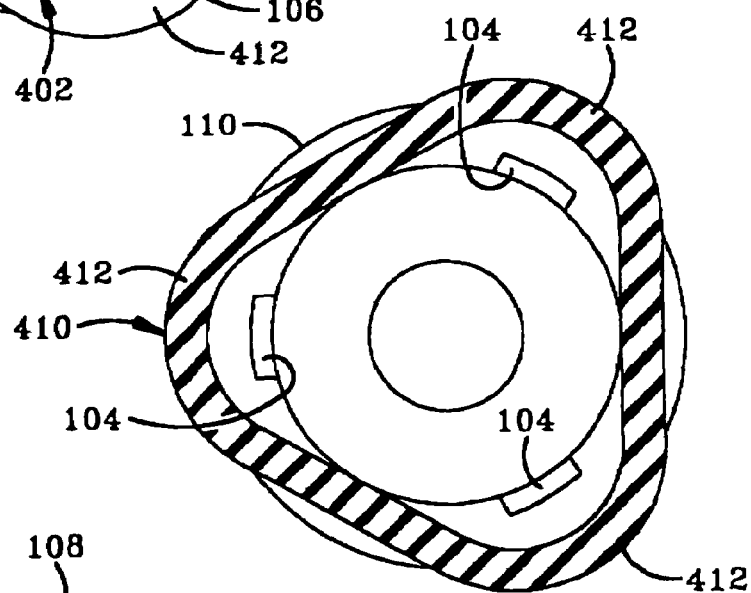
FIG. 30 is a section view of 30-30 of FIG. 28.
Figure 31:
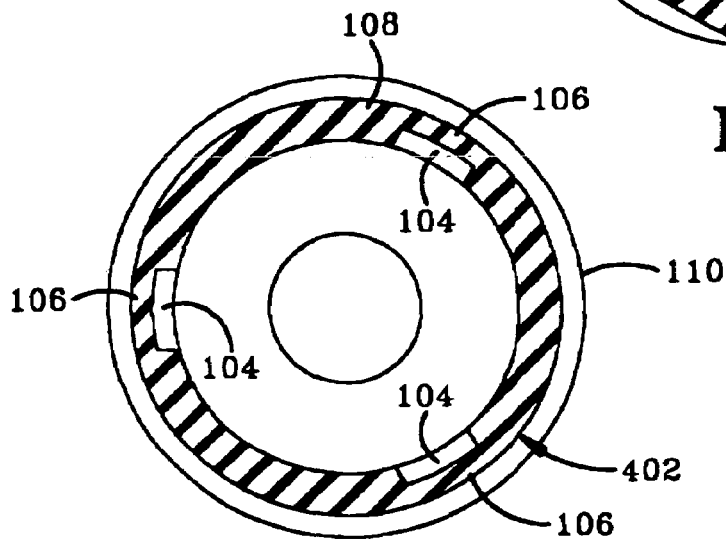
FIG. 31 is a section view of 31-31 of FIG. 28.

Another configuration of a milking liner is indicated generally by the numeral 400 in FIGS. 27-31. Liner 400 uses mouthpiece 102 and milk tube 4 as described above. Liner 400 includes a sleeve 402 that uses the longitudinal channels 104 to form hinges 106 as described above. A band 410 is integrally formed in sleeve between 40 and 60 percent of the overall length of sleeve 402. Band 410 includes corners 412 that protrude from the outer surface of sleeve 402. Band 410 increases the likelihood that sleeve 402 will fully collapse into the desired shape by strengthening the walls at the hinges. The protruding corners 412 of band 410 are aligned with hinges 106. FIG. 28 shows that channels 104 are disconnected at the central wall 414 of protruding band 410. Each channel 104 may taper at areas 416. Central wall 414 thus provides a constant sidewall thickness band about the center of sleeve 402. Protruding corners 412 are thus more difficult to collapse inwardly and cooperate with hinges 106 to cause sidewall portions 108 to collapse inwardly in the predictable configuration discussed above. When different numbers of hinges 106 are used as discussed above, different numbers of protruding corners 412 are correspondingly used to have the same result.

Figures 32, 33:
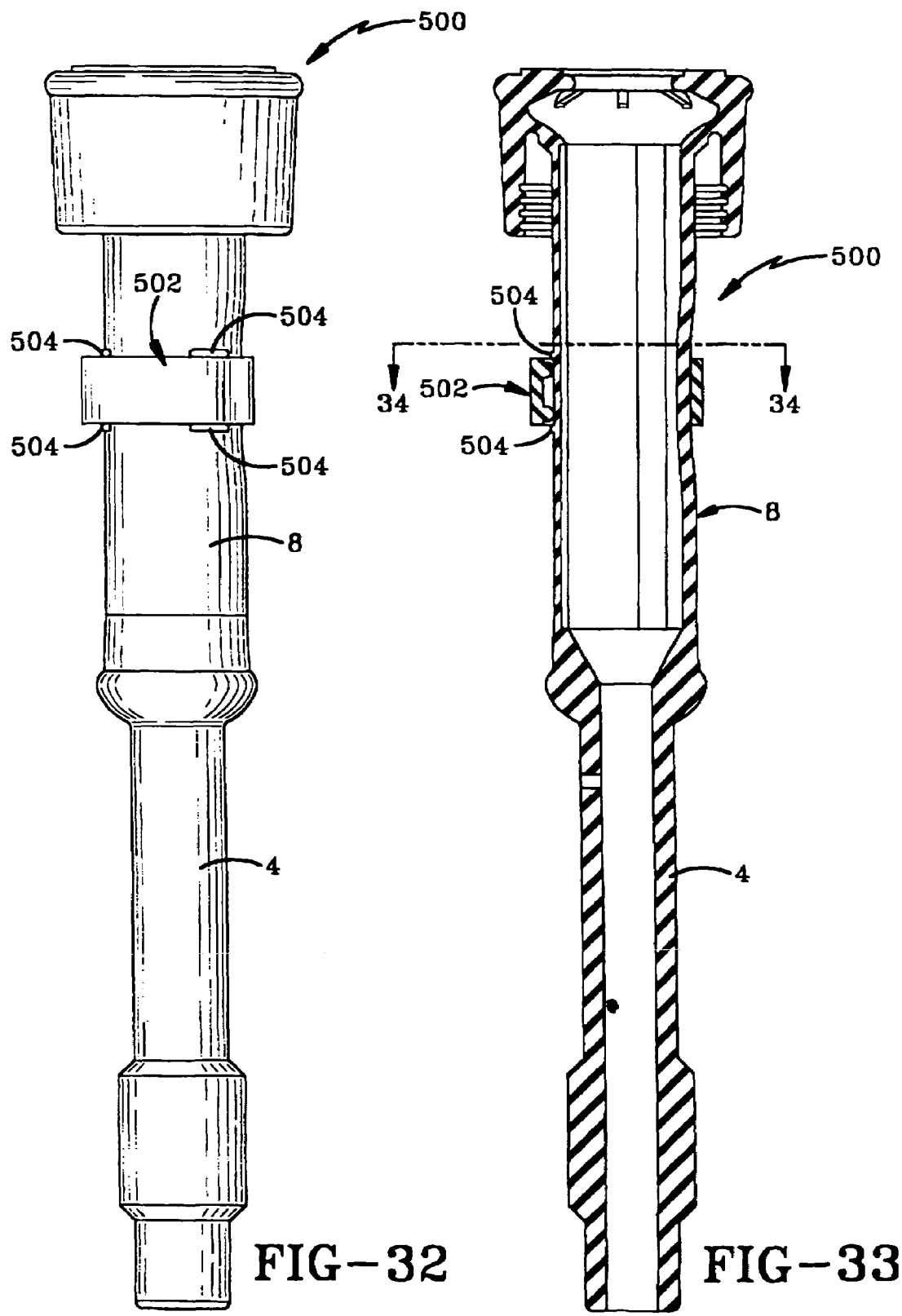
FIG. 32 is an elevation view of another exemplary configuration of a milking liner.
FIG. 33 is a longitudinal section view of FIG. 32.
Figure 34:
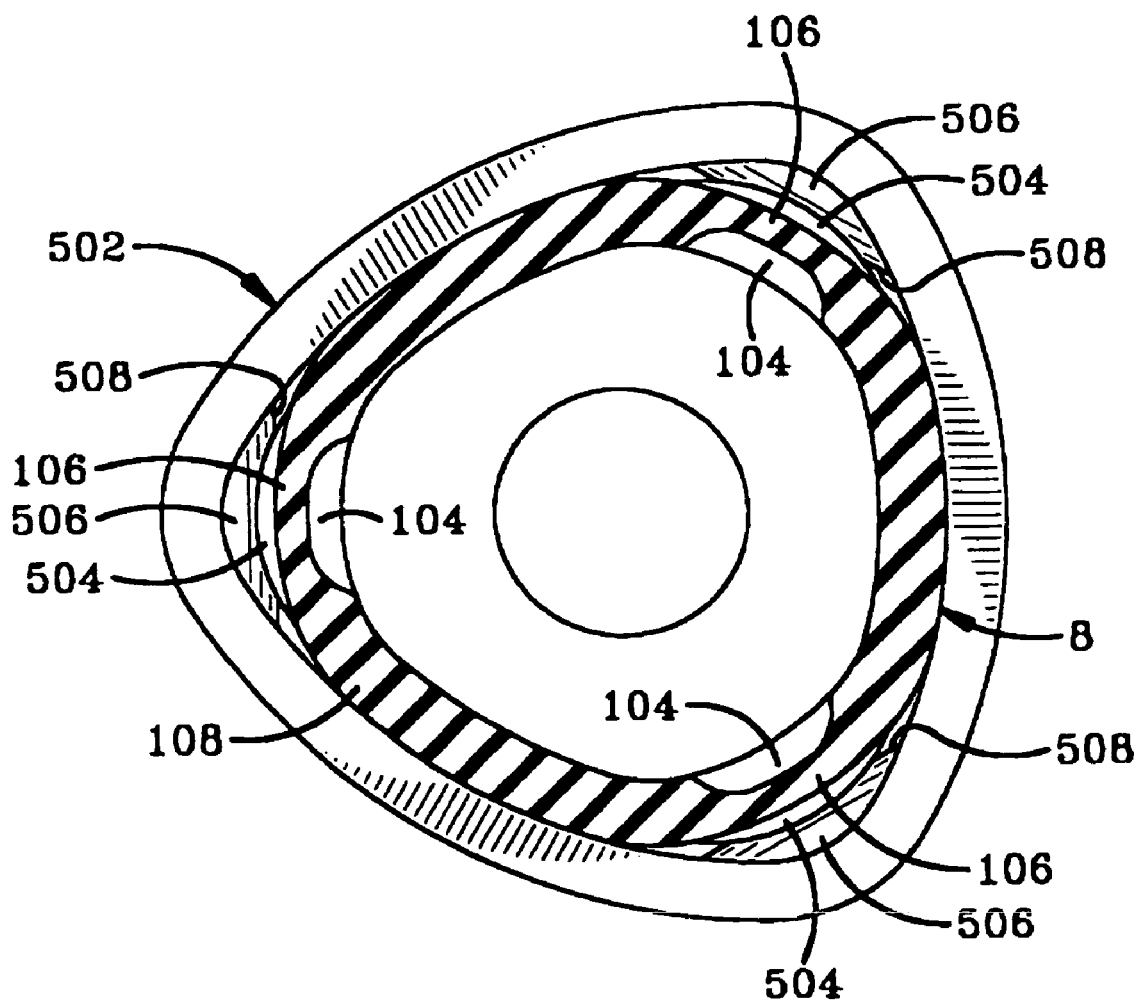
FIG. 34 is a section view taken along line 34-34 of FIG. 33.

Another configuration of a milking liner is indicated generally by the numeral 500 in FIGS. 32-34. Liner 500 includes a modified liner 100 in combination with an outer band 502. Band 502 has a thickness substantially equal to the thickness of sidewall portions 108 and may be made from the same material as sleeve 8. In this embodiment, sleeve 8 of liner 100 may be optionally modified to include positioning ribs 504 that are used to maintain the position of outer band 502 on sleeve 8. Band 502 is positioned at the end of or below the end of the teat to allow sleeve 8 to have room for teat insertion when sleeve 8 is uncollapsed.

When band 502 is positioned on sleeve 8, sleeve 8 tapers from its round cross-sectional configurations where it is connected to mouthpiece 102 and transition bead 110 to a partially collapsed configuration where band 502 is located. The shape of the partially collapsed configuration is determined by the interaction between the interior band 502 and the structure of sleeve 8. In the exemplary embodiment of the invention, band 502 has a substantially triangular shape in its resting position. The inside surface of band 502 is, however, hexagonally shaped through the use of positioning ribs 506 that are disposed at the interior corners of band 502. Band 502 may be provided in other shapes to match the configuration of hinges 106 or sleeve 8. Ribs 506 have flat inner surfaces 508 that flatten hinges 106 when band 502 is installed on sleeve 8 as depicted in FIG. 34. Band 502 thus only slightly compresses the central portion of sleeve 8 so that sleeve 8 smoothly tapers from its round cross-sectional ends to its hexagonal cross-sectional middle. Band 502 prevents sleeve 8 from collapsing in an oval shape by providing support outside of sidewall portions 108.

Figure 37:
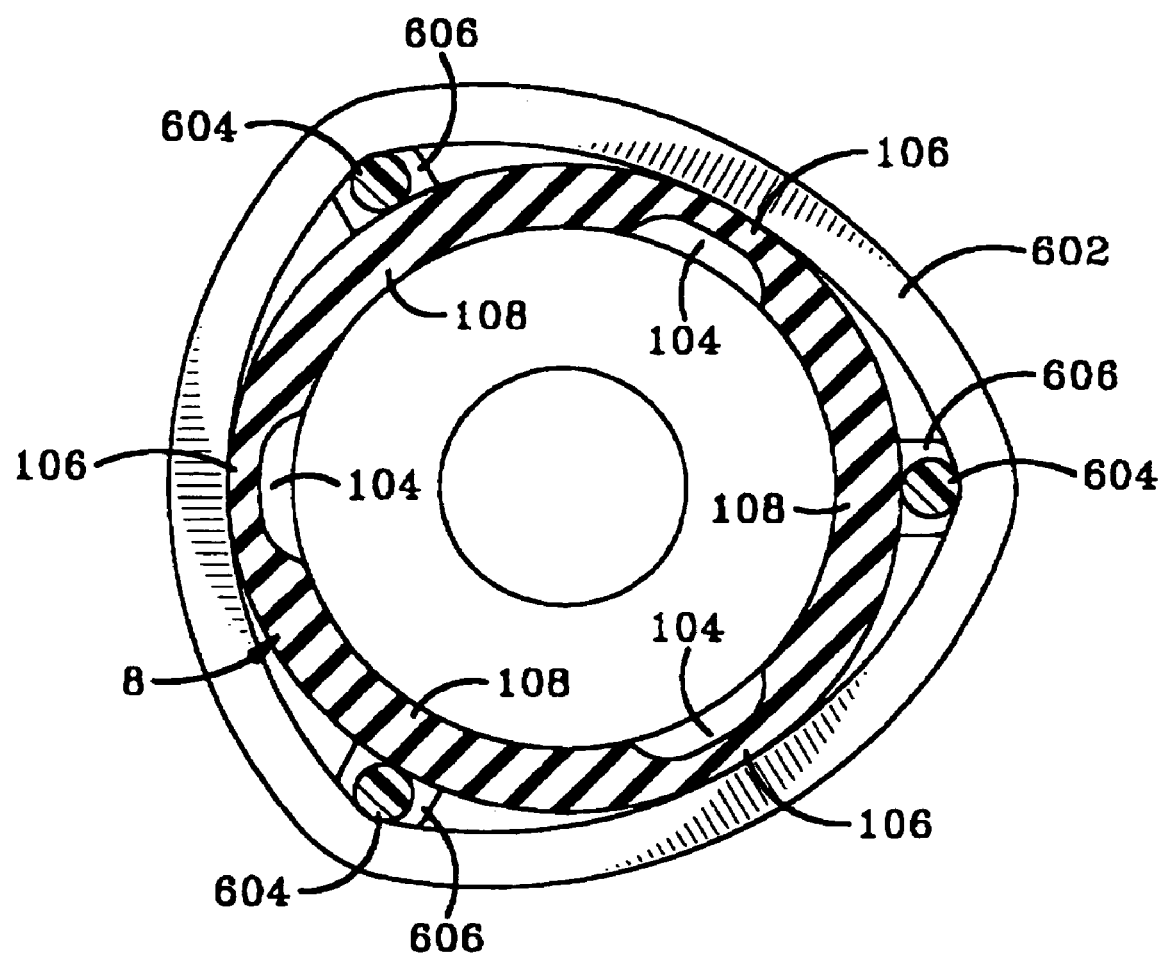
FIG. 37 is a section view taken along line 37-37 of FIG. 36.
Figure 38:
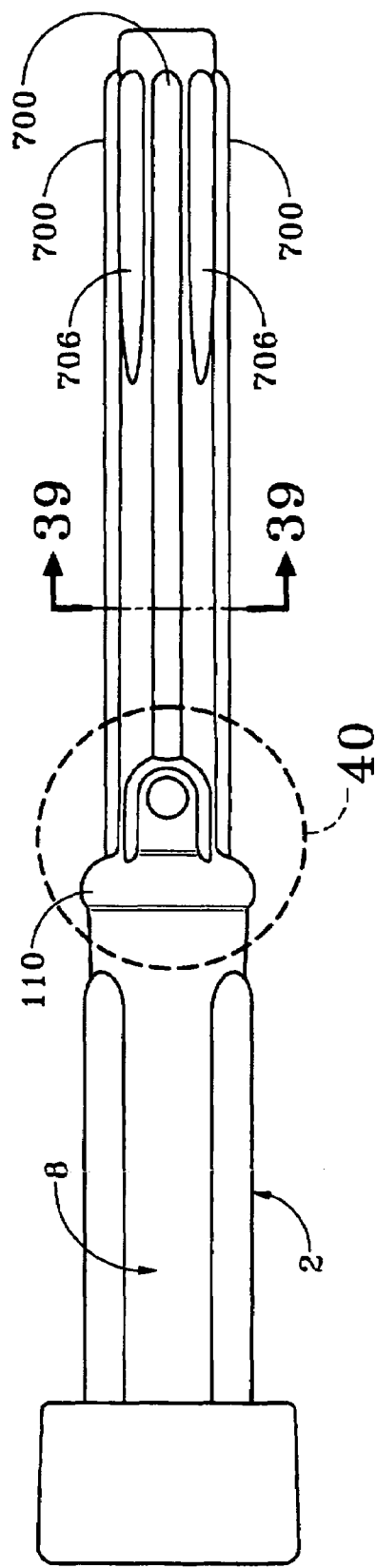
FIG. 38 is an elevation view of an exemplary configuration for a short milk tube.

Another configuration of a milking liner is indicated generally by the numeral 600 in FIGS. 35-37. Liner 600 also uses a band 602 about a middle portion of sleeve 8. In this embodiment, a plurality of rods 604 are disposed along the outer surface of the sidewall of sleeve 8 to support sleeve 8 and prevent sidewall portions 108 from undesirably flexing outwardly. Rod 604 may be fabricated from a substantially rigid material such as metal or plastic. Rods 604 are held in position in pockets 606 disposed adjacent mouthpiece 102 and transition bead 110. The ends of each rod 604 may include protuberances that snap fit into the sidewall of pocket 606 to hold rod 604 in place. In general, rods 604 are held in place through the interference fit because rods 604 are longer than the opening between corresponding pocket 606.

Figure 40:
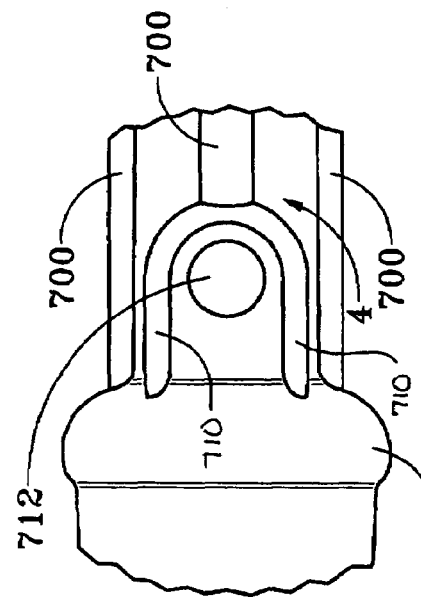
FIG. 40 is an enlarged elevation view of the area of the short milk tube surrounding the vent.
Figure 39:
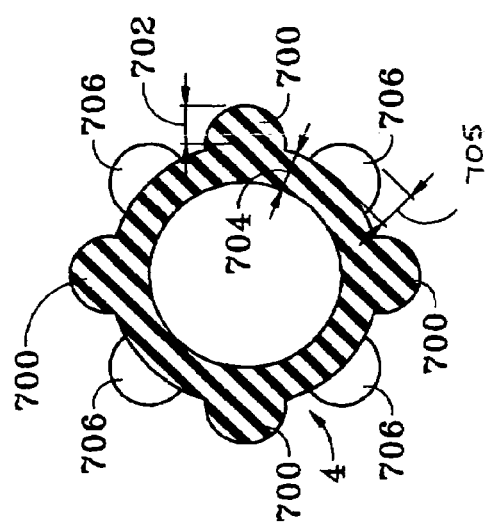
FIG. 39 is a section view taken along line 39-39 of FIG. 38.
Figure 41:
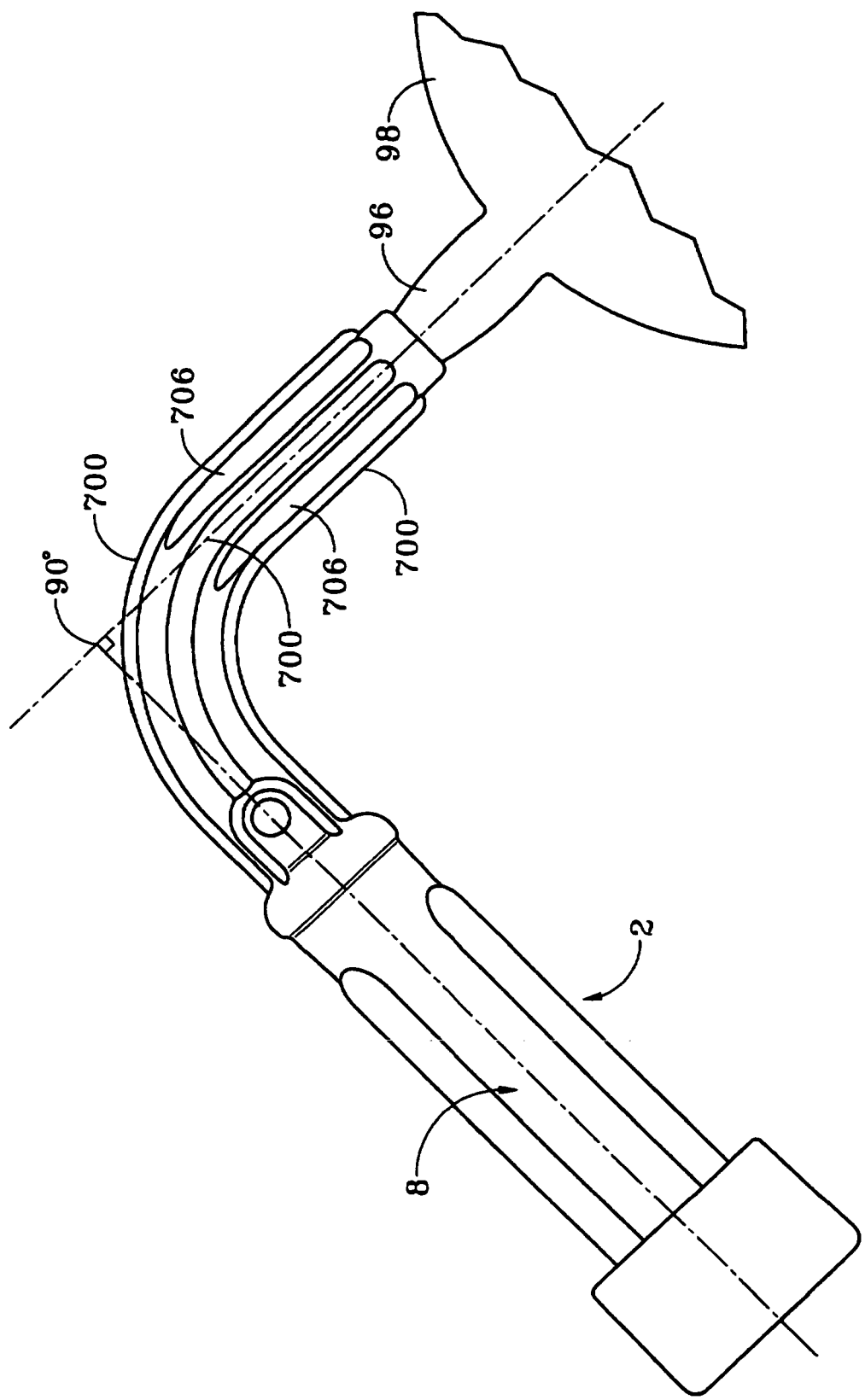
FIG. 41 is an elevation view of the milking liner of FIG. 38 with the short milk tube bent 90 degrees with respect to the longitudinal axis of the milking liner.

Another configuration of a short milk tube 4 is depicted in FIGS. 38-41. In this configuration, short milk tube 4 includes a plurality of external ribs 700 that reinforce milk tube 4 and preventing it from kinking when tube 4 is bent up to 90 degrees as shown in FIG. 41. Ribs 700 are solid and integrally formed with the body of short milk tube 4. In the exemplary embodiment, ribs 700 are evenly distributed about short milk tube 4 at 90 degree intervals. Each rib 700 has a thickness 702 that is at least equal to the wall thickness 704 of short milk tube 4. Ribs 700 may be formed to have the same cross sectional shape and cross sectional dimensions (such as height 705) as the ribs 706 disposed at the tip 708 of short milk tube 4.

Another aspect of short milk tube 4 is shown in FIG. 40 wherein one of ribs 700 is split into two arms 710 that extend around vent plug 712. Arms 710 reinforce the wall of short milk tube at the location of vent plug 712 to limit the amount that the wall bends at the vent plug location. Limiting the bending of the wall at the location of vent plug 712 helps prevent the plug from being unintentionally forced or flexed out of the wall.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations described herein may be used alone or in combination with other configurations.

The invention claimed is:

1. A milking liner for an automated milking machine having a shell; the milking machine periodically subjecting the liner to a vacuum milking condition; the milking liner comprising:

a barrel having a sidewall with an upper end and a lower end; the barrel sidewall having an inner surface and an outer surface;

the barrel having uncollapsed and collapsed conditions;

the barrel having a longitudinal axis;

the barrel defining at least three parallel channels open to the inner surface of the barrel;

the configuration of the sidewall of the barrel and the channels causing the barrel to uniformly collapse when the barrel is subjected to a vacuum milking condition;

a short milk tube connected to the lower end of the barrel; the short milk tube having a longitudinal length; the short milk tube including a plurality of longitudinal ribs; and a vent plug disposed through a portion of the short milk tube; at least one of the longitudinal ribs having an end that is split into a pair of spaced arms that at least partially surround the vent plug.

2. A milking liner for an automated milking machine having a shell; the milking machine periodically subjecting the liner to a vacuum milking condition; the milking liner comprising:

a barrel having an upper end and a lower end; the barrel having an inner surface and an outer surface; the barrel being adapted to engage the shell at the upper and lower ends of the barrel while being free of interconnections with the shell between the upper and lower ends of the barrel;

the barrel having a longitudinal axis;

the barrel defining three ribs that are each parallel to the longitudinal axis of the barrel;

each rib defining a channel that is open to the inner surface of the barrel;

the barrel also defining three semi-circular sidewall segments that each have a constant thickness; each pair of semi-circular sidewall segments being separated from each other by a rib; each rib extends outwardly beyond an outer surface of the sidewall segments;

each rib having an inner surface and an outer surface that define a rib thickness; the rib thickness being no greater than the thickness of the sidewall segments; and the sidewall segments movable between uncollapsed and collapsed conditions; the sidewall segments moving to the collapsed condition during the vacuum milking condition;

the sidewall segments being bowed outwardly to generally define a circle when the segments are in the uncollapsed condition; and each of the sidewall segments being bowed inwardly in the collapsed condition.

3. The milking liner of claim 2, wherein the sidewall of the barrel is free of interconnections with the shell.

4. The milking liner of claim 2, further comprising a short milk tube integrally connected to the lower end of the barrel and a short milk tube sleeve; the short milk tube having a length; the short milk tube sleeve disposed inside the short milk tube to reinforce the short milk tube; the short milk tube sleeve extending along a majority of the length of the short milk tube.

5. The milking liner of claim 2, further comprising a short milk tube integrally connected to the lower end of the barrel and a short milk tube sleeve; the short milk tube sleeve disposed outside the short milk tube to reinforce the short milk tube.

6. The milking liner of claim 2, further comprising a mouthpiece integrally connected to the upper end of the barrel; the mouthpiece having a flange disposed around a portion of the barrel; the flange adapted to engage the shell when the liner is connected to the shell; the portion of the flange adapted to engage the shell defining a plurality of parallel annular ribs.

7. The milking liner of claim 2, further comprising a short milk tube integrally connected to the lower end of the barrel; the short milk tube having a plurality of external longitudinal ribs configured to allow the short milk tube to bend at least 90 degrees without collapsing.

8. The milking liner of claim 7, wherein the short milk tube has a minimum wall thickness; each of the longitudinal ribs having a thickness that is at least equal to the minimum wall thickness of the short milk tube.

9. The milking liner of claim 7, wherein the short milk tube has a length and the short milk tube includes four longitudinal ribs disposed along the majority of the short milk tube length.

10. The milking liner of claim 9, wherein the four longitudinal ribs that are disposed along the majority of the short milk tube length are evenly disposed about the cross section of the short milk tube at 90 degree intervals.

11. The milking liner of claim 2, further comprising a vent plug and a short milk tube connected to the lower end of the barrel and a short milk tube sleeve; the vent plug being disposed through a portion of the short milk tube; the short milk tube having an external longitudinal rib disposed at least partially around the vent plug.

12. The milking liner of claim 2, wherein barrel has a cross sectional circumference; the arc length of the segments being 58 to 78 percent of the cross sectional circumference of the barrel.

13. The milking liner of claim 2, wherein each of the channels has a depth in the range of 140 to 160 percent of the thickness of the sidewall segments.

14. A milking liner for an automated milking machine having a shell; the milking machine periodically subjecting the liner to a vacuum milking condition; the milking liner comprising:

a barrel having a sidewall with an upper end and a lower end; the barrel sidewall having an inner surface and an outer surface;

the barrel having uncollapsed and collapsed conditions;

the barrel having a longitudinal axis;

the barrel defining at least three parallel channels open to the inner surface of the barrel;

the configuration of the sidewall of the barrel and the channels causing the barrel to uniformly collapse when the barrel is subjected to a vacuum milking condition;

a short milk tube connected to the lower end of the barrel; the short milk tube having a longitudinal length; the short milk tube having a plurality of longitudinal ribs configured to allow the short milk tube to bend at least 90 degrees without collapsing;

the short milk tube having a length and the short milk tube includes four longitudinal ribs disposed along the majority of the short milk tube length;

the four longitudinal ribs that are disposed along the majority of the short milk tube length being evenly disposed about the cross section of the short milk tube at 90 degree intervals; and one of the four longitudinal ribs disposed along the majority of the short milk tube length having an end that is split into a pair of spaced arms; the short milk tube carrying a vent plug between the arms.

* * * * *